(12) United States Patent
Noh et al.

(10) Patent No.: US 10,560,958 B2
(45) Date of Patent: Feb. 11, 2020

(54) INTERFACE DEVICE AND METHOD IN WIRELESS COMMUNICATION NETWORK

(71) Applicants: Samsung Electronics Co., Ltd., Gyeonggi-do (KR); Industry-Academic Cooperation Foundation, Yonsei University, Seoul (KR)

(72) Inventors: Hoon-Dong Noh, Gyeonggi-do (KR); Jang-Won Lee, Seoul (KR); Youn-Sun Kim, Gyeonggi-do (KR); Hyun-Suk Lee, Gyeonggi-do (KR); Young-Woo Kwak, Gyeonggi-do (KR); Seok-Jae Moon, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 65 days.

(21) Appl. No.: 15/899,870

(22) Filed: Feb. 20, 2018

(65) Prior Publication Data

US 2018/0242349 A1 Aug. 23, 2018

(30) Foreign Application Priority Data

Feb. 20, 2017 (KR) .................. 10-2017-0022422

(51) Int. Cl.
| | | |
|---|---|---|
| *H04W 72/04* | (2009.01) | |
| *H04W 72/12* | (2009.01) | |
| *H04L 29/06* | (2006.01) | |
| *H04W 72/10* | (2009.01) | |
| *H04W 88/08* | (2009.01) | |

(52) U.S. Cl.
CPC ......... *H04W 72/1278* (2013.01); *H04L 69/22* (2013.01); *H04W 72/10* (2013.01); *H04W 88/08* (2013.01)

(58) Field of Classification Search
CPC ........ H04L 25/00; H04L 69/22; H04W 72/10; H04W 72/1278; H04W 88/08
See application file for complete search history.

(56) References Cited

U.S. PATENT DOCUMENTS

| | | | |
|---|---|---|---|
| 2016/0142458 A1 | 5/2016 | Shor et al. | |
| 2017/0264719 A1* | 9/2017 | Koramutla | .............. H04L 41/50 |
| 2018/0027585 A1* | 1/2018 | Guo | ..................... H04B 7/0408 370/336 |
| 2018/0159611 A1* | 6/2018 | Majmundar | ............ H04L 47/38 |
| 2019/0074955 A1* | 3/2019 | Shimomura | ...... H04W 72/1236 |

* cited by examiner

*Primary Examiner* — Asad M Nawaz
*Assistant Examiner* — Zhaohui Yang
(74) *Attorney, Agent, or Firm* — The Farrell Law Firm, P.C.

(57) ABSTRACT

A signal processing device of a base station being connected to one or more wireless devices of the base station is provided. The signal processing device includes a memory and a processor configured to transmit wireless device setting information to the one or more wireless devices via a front-haul interface during a predetermined time frame, transmit a downlink packet, which is obtained by packetizing downlink baseband data, to the one or more wireless devices via the front-haul interface, receive an uplink packet through the front-haul interface, obtain uplink baseband data and inherent control information by performing uplink packetization on the received uplink packet, and process the uplink baseband data based on analysis of the obtained inherent control information.

16 Claims, 14 Drawing Sheets

| 1910 | 1920 | 1930 | 1940 | 1950 |
|---|---|---|---|---|
| RU ID | UL decoding results | UCI | Measurements from SRS | Measurements from PRACH |

FIG.19

| 2010 | 2020 | 2030 | 2040 | 2050 |
|---|---|---|---|---|
| RU ID | Soft-demod. results for UCI on PUSCH | Soft-demod. results on PUCCH | Measurements from SRS | Measurements from PRACH |

FIG.20

| 2110 | 2120 | 2130 | 2140 | 2150 |
|---|---|---|---|---|
| RU ID | IQ symbols for UCI on PUSCH | IQ symbols for PUCCH | IQ symbols for SRS | IQ symbols for PRACH |

FIG.21

INTERFACE DEVICE AND METHOD IN WIRELESS COMMUNICATION NETWORK

PRIORITY

This application claims priority under 35 U.S.C. § 119(a) to Korean Patent Application Serial No. 10-2017-0022422, which was filed on Feb. 20, 2017 in the Korean Intellectual Property Office, the entire content of which is incorporated herein by reference.

BACKGROUND

1. Field of the Disclosure

The present disclosure relates, generally, to an interface device, and more particularly, to a front-haul interface device and method in a separate base station based on a wireless network.

2. Description of the Related Art

Efforts are underway to develop an improved 5G (5$^{th}$ generation) communication system or a pre-5G communication system in order to meet the growing demand for wireless data traffic after commercialization of a 4G (4$^{th}$ generation) communication system. The 5G communication or the pre-5G communication system is sometimes referred to as a "beyond 4G network communication system" or a "post long term evolution (LTE) system."

In order to achieve a high data transmission rate, the 5G communication system in an ultra-high frequency (mm-Wave) band (e.g., a 60 GHz band) has been considered. In order to mitigate a path loss of an electric wave and to increase a transmission distance of an electric wave in the ultra-high frequency band, beam-forming technology, massive multi-input multi-output (massive MIMO) technology, full dimensional MIMO (FD-MIMO) technology, array antenna technology, analog beam-forming technology, and large scale antenna technology are being considered in the 5G communication system.

In addition, in order to improve a system network, evolved small cell technology, advanced small cell technology, cloud radio access network (C-RAN) technology, ultra-dense network technology, device to device (D2D) communication technology, wireless backhaul technology, moving network technology, cooperative communication technology, coordinated multi-points (CoMP) technology, interference cancellation technology, and so on are being developed in the 5G communication system.

In addition, hybrid frequency-shift keying (FSK) and quadrature amplitude modulation (QAM) (FQAM) modulation and sliding window superposition coding (SWSC), which are advanced coding modulation (ACM) methods, and filter bank multi carrier (FBMC), non-orthogonal multiple access (NOMA), sparse code multiple access (SCMA) and so on, which are advanced connection technologies, are being developed in the 5G system.

The C-RAN technology includes a separate base station introduced as a method for efficiently constructing more cells with the same area. The C-RAN technique is a technique for separating functions of a base station to be processed by two units, that is, a digital unit (DU) and a radio unit (RU). The DU performs most of the functions of processing baseband signals, and the RU performs only a minimum function of transmitting and receiving signals through an antenna.

The C-RAN technology is based on centrally locating DUs, which are separated from a plurality of base stations, and distributing RUs, which are respectively separated from the plurality of base stations by service region for cell building.

The installation and operation costs of a base station can be reduced when the DUs and RUs are separated according to the C-RAN technology and connected by a data link called a front-haul. The front-haul-based interface technology includes a common public radio interface (CPRI), an open radio interface (ORI), etc.

In the case of the C-RAN, since the DUs are concentrated in one place in the form of a cloud data center, interference between cells can be easily adjusted, and a high-quality service, such as cooperative communication, can be provided. Further, by collecting and operating the DUs in one place, a rental cost and a power cost in network operation can be reduced, and maintenance can be facilitated.

Generally, in a next generation communication system, various topologies, such as a high density compact cell technology, may be considered. In the next generation communication system, when a C-RAN environment is configured using a front-haul interface technology, such as a CPRI or an ORI, an excessive capacity in a data link corresponding to the front-haul may be required. Further, it may be difficult to support a complicated topology due to a high density compact cell technology.

For this reason, a need exits for a next-generation communication system that includes a front-haul interface technology that can easily configure a C-RAN environment.

SUMMARY

The present disclosure has been made to address at least the disadvantages described above and to provide at least the advantages described below.

According to an aspect of the present disclosure, a device and method for supporting adaptive function split based on a separate base station in a wireless communication network are provided.

According to an aspect of the present disclosure, a device and method for performing packetization and de-packetization for transmitting a packet via a front-haul interface in a wireless communication network supporting a separate base station are provided.

According to an aspect of the present disclosure, a device and method for performing packetization and de-packetization adaptively to a change in data transmission characteristics and/or transmission capacity in a front-haul interface according to the support of adaptive function split technology in a wireless communication network that supports a separate base station are provided.

According to an aspect of the present disclosure, a packetization and de-packetization apparatus and method that support a flexible network topology based on an adaptive function split technology in a separate base station are provided.

In accordance with an embodiment of the present disclosure, there is provided a signal processing device of a base station, the signal processing device being connected to one or more wireless devices of the base station. The signal processing device includes a memory and a processor configured to transmit wireless device setting information to the one or more wireless devices via a front-haul interface during a predetermined time frame, transmit a downlink packet, which is obtained by packetizing downlink baseband data, to the one or more wireless devices via the front-haul interface, receive an uplink packet through the front-haul interface, obtain uplink baseband data and inherent control information by performing uplink packetization on the received uplink packet, and process the uplink baseband data based on analysis of the obtained inherent control information.

In accordance with an embodiment of the present disclosure, there is provided a wireless device of a base station, the wireless device being connected to one or more signal processing devices of the base station. The wireless device includes a memory and a processor configured to receive wireless device setting information via a front-haul interface during a predetermined time frame, receive a downlink packet through the front-haul interface, and transmit downlink baseband data, which is obtained by performing de-packetization on the received downlink packet, via a wireless channel, obtain uplink baseband data by processing a wireless signal received via the wireless channel based on the wireless device setting information, extract inherent control information from the obtained uplink baseband data, and transmit an uplink signal, which is obtained by packetizing the extracted inherent control information and the uplink baseband data, to the one or more signal processing devices via the front-haul interface.

In accordance with an embodiment of the present disclosure, there is provided a method of processing data in a signal processing device of a base station, the signal processing device being connected with one or more wireless devices in the base station. The method includes transmitting wireless device setting information to the one or more wireless devices via a front-haul interface during a predetermined time frame, packetizing the downlink baseband data received through a back-haul interface and transmitting a downlink packet generated by the packetization to the one or more wireless devices via the front-haul interface, receiving an uplink packet through the front-haul interface and performing de-packetization on the received uplink packet to obtain uplink baseband data and inherent control information, and processing the uplink baseband data based on analysis of the obtained inherent control information, and outputting the processed uplink baseband data through the back-haul interface.

In accordance with an embodiment of the present disclosure, there is provided a method of processing data in a wireless device of a base station, the wireless device being connected with one or more signal processing devices in the base station. The method includes receiving wireless device setting information via a front-haul interface during a predetermined time frame, receiving a downlink packet through via the front-haul interface, performing de-packetization on the received downlink packet, and transmitting downlink baseband data obtained by the de-packetization via a wireless channel, obtaining uplink baseband data by processing a wireless signal received through the wireless channel based on the wireless device setting information, extracting inherent control information from the obtained uplink baseband data, and performing packetization on the extracted inherent control information and the uplink baseband data and transmitting an uplink packet obtained by the packetization to the one or more signal processing devices via the front-haul interface.

BRIEF DESCRIPTION OF THE DRAWINGS

The above and other aspects, features and advantages of certain embodiments of the present invention will be more apparent from the following detailed description taken in conjunction with the accompanying drawings, in which:

FIG. 19 is a diagram of a payload structure of a QoS-important packet including some main information of uplink baseband data when functions corresponding to Intra L2 and MAC-PHY are performed in an RU of an LTE communication system, according to an embodiment of the present disclosure;

FIG. 20 is a diagram of a payload structure of a QoS-important packet including some main information of uplink baseband data when functions corresponding to Intra L2, MAC-PHY, and PHY3 are performed in an RU of an LTE communication system, according to an embodiment of the present disclosure;

FIG. 21 is a diagram of a payload structure of a QoS-important packet including some main information of uplink baseband data when functions corresponding to Intra L2, MAC-PHY, PHY3, and PHY2 are performed in an RU of an LTE communication system, according to an embodiment of the present disclosure;

DETAILED DESCRIPTION

Figure 1:
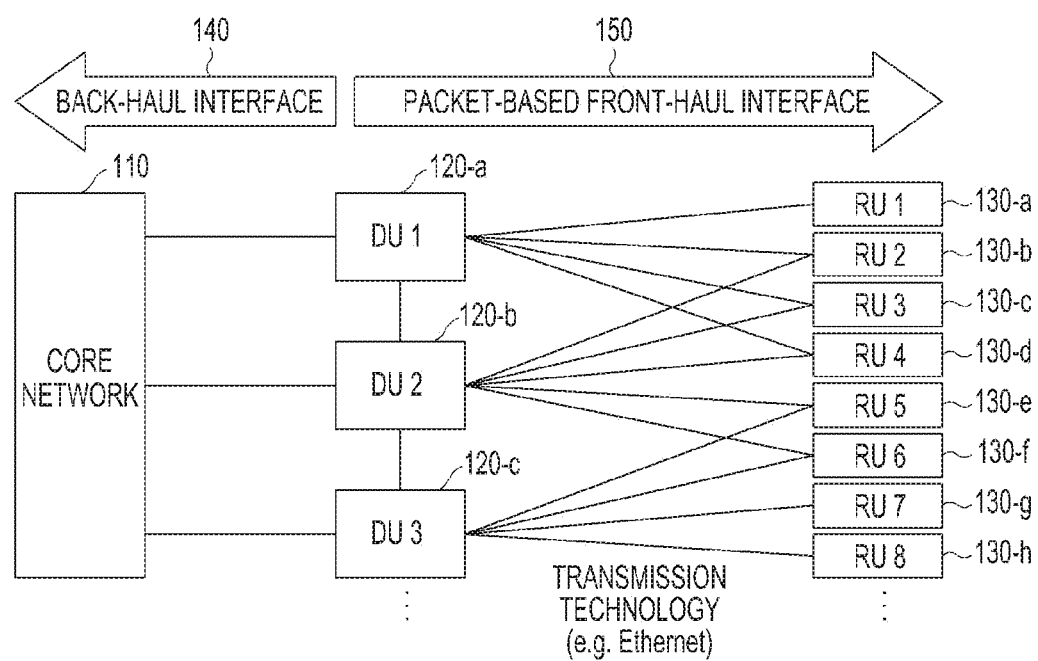
FIG. 1 is a diagram of a C-RAN environment in a wireless communication system, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an application-specific integrated circuit (ASIC) chip, a field-programmable gate arrays (FPGA), and a programmable-logic device for performing operations which has been known or are to be developed hereinafter.

A separate base station of the present disclosure may have a structure in which one or more DUs are coupled with one or more RUs via a front-haul interface. It is necessary for the one or more DUs and the one or more RUs, which constitute the separate base station, to exchange downlink packets and uplink packets through the front-haul interface. It is premised that the one or more DUs and the one or more RUs support an adaptive function split technology. The function split technology enables the DUs and the RUs to divide and process all functions performed by a single base station for the purpose of packet exchange between a back-haul interface and a wireless channel. In addition, the adaptive function split technology is capable of changing functions to be processed by the DUs and functions to be processed by the RUs depending on a situation through function split setting. The function split setting defines functions to be processed by the DUs and functions to be processed by the RUs. The function split setting may be dependent on packetization option. That is, in the separate base station, the function split setting may be adaptively changed depending on the packetization option.

A signal processing procedure for packet exchange via a front-haul interface and an operation performed in each of the DU and the RU in a separate base station, which supports an adaptive function split technology is described herein. In addition, examples of configuring packets to be exchanged through a front-haul interface in consideration of functions, which are respectively divided to the DU and the RU due to the application of the adaptive function split technology, will be described herein. A signal processing procedure in which the DU transmits a downlink packet to the RU through the front-haul interface, and the configuration and operation of each of the DU and the RU, and the structure of the downlink packet, and a signal processing procedure in which the RU transmits an uplink packet to the DU through the front-haul interface, and the configuration and operation of each of the DU and the RU, and the structure of the uplink packet will also be described.

A method of supporting transmission differentiation of multiplexed uplink control information in a physical uplink shared channel (PUSCH) is described herein. The transmission differentiation may be defined as an overall operation in which the type of uplink control information is determined based on function split setting (packetization option, etc.), and the determined type of uplink control information is packetized and transmitted.

An operation of performing packetization or de-packetization of uplink and downlink packets so as to be transmitted or received via a front-haul interface in a separate base station is described herein. The packetization method may include performing packetization in such a manner that a QoS of data to be transmitted is distinguished (hereinafter, QoS-wise packetization method), and a method of performing packetization for each terminal, which is to transmit data (hereinafter, user-wise packetization method) is described herein. A method of selectively using the QoS-wise packetization method and the user-wise packetization method in consideration of a packetization option (hereinafter, mixed packetization method) is also described herein.

A packetization option, which allows a method for packetization to be adaptively specified when packetization is performed based on the mixed packetization method in the separate base station is described herein, and a method of performing packetization and de-packetization using the packetization option is described herein.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the present disclosure, the term "user" may indicate a person using an electronic device or a device (e.g., an artificial intelligence electronic device) using an electronic device.

FIG. 1 is a diagram of a C-RAN environment in a wireless communication system, according to an embodiment of the present disclosure.

Referring to FIG. 1, a C-RAN is connected to a core network 110 via a back-haul interface 140. The C-RAN may include a plurality of DUs 120-*a*, 120-*b*, and 120-*c* and a plurality of RUs 130-*a*, 130-*b*, 130-*c*, 130-*d*, 130-*e*, 130-*f*, 130-*g*, and 130-*h* that are connected via a front-haul interface 150. The front-haul interface 150 may support packet-based data transmission.

The plurality of DUs 120-*a*, 120-*b*, and 120-*c* are separated from a plurality of base stations, and the plurality of RUs 130-*a*, 130-*b*, 130-*c*, 130-*d*, 130-*e*, and 130-*h* may be dispersedly located in a service area to be separated from each base station.

The back-haul interface 140 is an interface for connecting the plurality of DUs 120-*a*, 120-*b*, and 120-*c* to the core network 110. The front-haul interface 150 is an interface for connecting the plurality of DUs 120-*a*, 120-*b*, and 120-*c* and the plurality of RUs 130-*a*, 130-*b*, 130-*c*, 130-*d*, 130-*e*, 130-*f*, 130-*g*, and 130-*h*. Each of the plurality of DUs 120-*a*, 120-*b*, and 120-*c* may be connected to some or all of the plurality of RUs 130-*a*, 130-*b*, 130-*c*, 130-*d*, 130-*e*, 130-*f*, 130-*g*, and 130-*h* through the front-haul interface 150.

The DU1 120-*a* is coupled to RU1 130-*a*, RU2 130-*b*, RU3 130-*c*, and RU4 130-*a* via the front-haul interface 150, DU2 120-*b* is connected to RU2 130-*b*, RU3 130-*c*, RU4 130-*d*, RU5 130-*e*, and RU6 130-*f* via the front-haul interface 150, and DU3 120-*c* is connected to RU5 130-*e*, RU6 130-*f*, RU7 130-*g*, and RU8 130-*h* via the front-haul interface 150.

The front-haul interface 150 is an interface for exchanging data and control information between a DU and an RU, which are connected to each other via a wire-based optical cable. Standards for defining the front-haul interface 150 includes a CPRI, an ORI, an open base station architecture initiative (OBSAI), etc.

The structure of the C-RAN environment is not limited to that illustrated in FIG. 1, but can be equally applied to an ordinary structure of a separate base station to which the function split technology is applied.

The DUs and RUs can be nodes and antennas in which baseband functions (BBFs) of a plurality of base stations considered in a C-RAN environment are concentrated, and nodes including some baseband functions. Thus, a DU and an RU may be a baseband unit (BBU) pool, remote radio head (RRH), etc. in other technologies that take the C-RAN environment into consideration.

It will be considered that, in an environment in which the DUs and RUs are connected by a packet-based front-haul interface, the functions performed by each of the DUs and RUs may vary depending on function split setting. In the technology of a CPRI, which is a basic front-haul interface, it is common that a DU performs all baseband functions and an RU performs only the function of transmitting and receiving signals from the RU to an antenna.

The front-haul interface may impart a baseband function to each of the DU and the RU in consideration of the function split setting. The DU and the RU may include packetization and de-packetization functions for packet transmission and reception at the front-haul interface. Unlike the front-haul technology, such as CPRI and ORI, that has a structure which is difficult to perform transmission differentiation since the transmission differentiation is not considered, the methods and apparatuses described herein enable transmission differentiation of main information through packetization. To this end, the DU and the RU may include functions of extracting control information inherent for the purpose of transmission differentiation through additional processing, and analyzing the extracted inherent control information so as to be used in the baseband function. The DU and the RU may be connected based on a packet-based transmission technology, which enables transmission differentiation.

Figure 2:
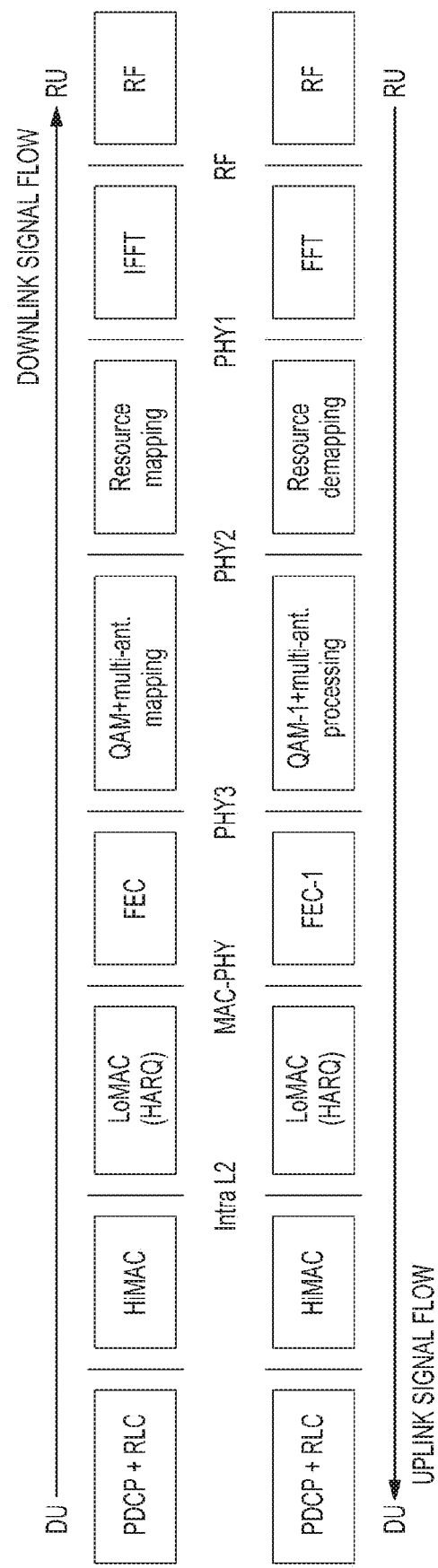
FIG. 2 is a diagram of function split in a separate base station, according to an embodiment of the present disclosure.

FIG. 2 is a diagram of function split in a separate base station, according to an embodiment of the present disclosure.

Referring to FIG. 2, downlink baseband data is processed by functions according to the progress from left to right (in the direction from an upper layer to a lower layer), and uplink baseband data is processed by functions according to the progress from right to left (in the direction from a lower layer to an upper layer).

The function split in the separate base station may set in one of the layers Intra L2, MAC-PHY, PHY3, PHY2, and PHY1, which distinguish the functions, to a function split position. Functions located on the left side with reference to the function split position may be set to functions to be performed by a DU, and functions located on the right side with reference to the function split position may be set to functions to be performed by an RU.

According to the setting of the function split position, the DU may configure the structure, data type or the like of a downlink packet to be transmitted to the RU via the front-haul interface, and the RU may configure the structure, data type or the like of an uplink packet to be transmitted to the DU via the front-haul interface.

Figure 3:
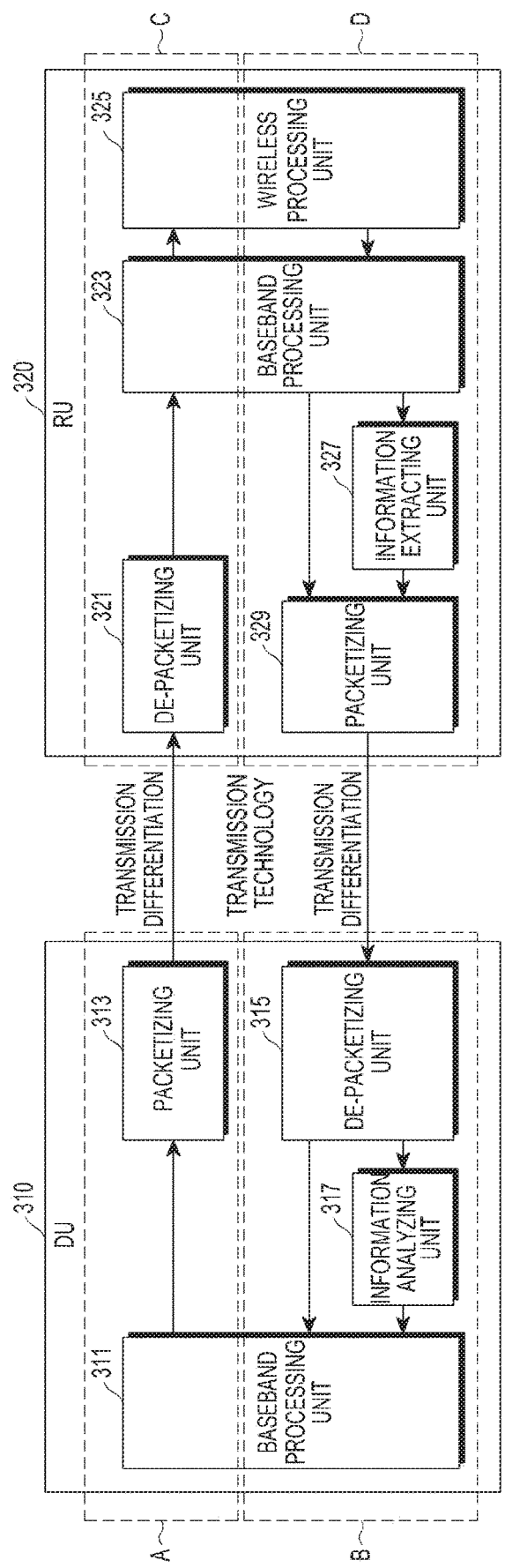
FIG. 3 is a diagram of a hardware configuration for each of a DU and an RU, which constitute a separate base station, according to an embodiment of the present disclosure.

FIG. 3 is a diagram of a hardware configuration for each of a DU and an RU, which constitute a separate base station, according to an embodiment of the present disclosure.

Referring to FIG. 3, the functions to be performed by each of a DU 310 and an RU 320 may be adaptively changed according to function split setting. The function split setting can include dividing functions for processing forward data and reverse data in the baseband into functions to be performed in the DU 310 and functions to be performed in the RU 320. The adaptive change of the function split setting according to a situation will be referred to as "adaptive function split." An example of the adaptive function split is performed as described with reference to FIG. 2.

The DU 310 transmits wireless device setting information to the RU 320 via the front-haul interface at a preset transmission unit cycle, or at a predetermined time frame. The DU 310 generates a downlink packet by packetizing downlink baseband data received from a core network via a back-haul interface and transmits the generated downlink packet to the RU 320 via the front-haul interface. The DU 310 may perform de-packetization on an uplink packet received from the RU 320 via the front-haul interface to obtain uplink baseband data and inherent control information. The DU 310 may process the uplink baseband data based on the analysis of the obtained inherent control information, and may transmit the uplink baseband data to the core network through the back-haul interface.

The RU 320 receives wireless device setting information from the DU 310 via the front-haul interface at a preset transmission unit cycle. The RU 320 generates an uplink packet by packetizing uplink baseband data received from the wireless network and transmits the generated downlink packet to the RU 320 via the front-haul interface. The DU 310 may perform de-packetization on an uplink packet received from the RU 320 via the front-haul interface to obtain uplink baseband data and inherent control information. The DU 310 may process the uplink baseband data based on the analysis of the obtained inherent control information, and may transmit the uplink baseband data to the core network through the back-haul interface.

Transmission differentiation, which is made in consideration of adaptive function split, may be applied when transmitting a downlink packet or an uplink packet on the front-haul interface.

Transmission differentiation, which is made in consideration of adaptive function split may be applied when transmitting a downlink packet or an uplink packet on the front-haul interface.

The DU 310 may include a baseband processing unit (DU-BBF) 311, a packetizing unit (DU-PKT) 313, a de-packetizing unit (DU-DPKT) 315, information analyzing unit (extracted information interpreter, DU-EII) 317, etc. The baseband processing unit 311 and the packetizing unit 313 included in the DU 310 constitute a first downlink processing block A, and the downlink packetizing unit 315 included in the DU 310, the information analyzing unit 317, and the baseband processor 311 constitute a first uplink processing block B.

The first downlink processing block A (e.g. a processor of the DU 310) may generate a downlink packet in consideration of the adaptive function split, and may transmit the generated downlink packet to the RU 320 via the front-haul interface. The downlink packet may be generated by wireless device setting information or downlink baseband data received from the core network.

The first uplink processing block B (e.g. a processor of the DU 310) may receive an uplink packet, which is transmitted in a differentiated manner from the RU 320 via the front-haul interface in consideration of adaptive function split, and may perform an operation for processing the received uplink packet as uplink baseband data. The uplink processing block may transmit the uplink baseband data to the core network via the back-haul interface.

The baseband processor 311 determines wireless device setting for a functional operation to be performed in the baseband by the RU 320, and performs a function of processing the baseband data transmitted between the RU 320 and a terminal.

The packetizing unit 313 performs packetization on the wireless device setting information and the downlink baseband data, and outputs a downlink packet generated by the packetization to the front-haul interface.

The de-packetizing unit 315 performs de-packetization on the uplink packet received via the front-haul interface, and outputs the uplink baseband data, on which de-packetization has been performed, to the baseband processing unit 311 and/or the information analyzing unit 317.

The information analyzing unit 317 performs an operation of analyzing the inherent control information extracted from the uplink baseband data in the RU 320 so that the inherent control information can be utilized in the baseband function. The information analyzing unit 317 may provide the extracted inherent control information to the baseband processing unit 311.

The baseband processing unit 311 may perform a processing procedure, which corresponds to a function set using the inherent control information extracted by the information analyzing unit 317, for processing the uplink baseband data provided by the de-packetizing unit 315. The uplink baseband data processed by the baseband processor 311 is transmitted to the core network via the back-haul interface.

The RU 320 may include a de-packetizing unit (RU-DPKT) 321, a baseband processor (RU-BBF) 323, a wireless processing unit (RF) 325, an information extracting unit (information extraction function, RU-IEF) 327, a packetizing unit (RU-PKT) 329, and the like. The de-packetizing unit 321, the baseband processing unit 323, and the wireless processing unit 325 included in the RU 320 constitute a second downlink processing block C, and the wireless processing unit 325, the baseband processing unit 323, the information extracting unit 327, and the packetizing unit 329 included in the RU 320 constitute a second uplink processing block D.

The second downlink processing block C (e.g. a processor of the RU 320) may receive a downlink packet from the DU 310 via the front-haul interface, may obtain downlink baseband data from the received downlink packet, and may generate a wireless signal based on the obtained downlink baseband data to transmit the wireless signal via a wireless channel. The downlink baseband data obtained from the downlink packet may be wireless device setting information or downlink baseband data received from the core network.

The second uplink processing block D (e.g. a processor of the DU 310) may obtain uplink baseband data from a wireless signal received via a wireless channel, may generate an uplink packet based on the obtained uplink baseband data, and may transmit the generated uplink packet to the DU 310 via the front-haul interface.

The de-packetizing unit 321 may perform de-packetization on the downlink packet received via the front-haul interface, and may provide the downlink baseband data, on which the de-packetization has been performed, to the baseband processing unit 323.

The baseband processing unit 323 may process the downlink baseband data, which is provided by the de-packetizing unit 321 according to a processing procedure corresponding to a function, which is set by the setting information for performing a function provided from the DU 310, and may transmit the downlink baseband data to the wireless processing unit 325.

The wireless processing unit 325 may generate a wireless signal based on the downlink baseband data received from the baseband processing unit 323, and may transmit the generated wireless signal through a wireless channel. The wireless processing unit 325 may receive a wireless signal via a wireless channel, may obtain uplink baseband data from the received wireless signal, and may transmit the obtained uplink baseband data to the baseband processor 323.

The baseband processing unit 323 may process the uplink baseband data transmitted from the wireless processing unit 325 according to a processing procedure corresponding to a function set by the setting information for performing a function provided by the DU 310, and may provide the processed uplink baseband data to the packetizing unit 329 and/or the information extracting unit 327.

The information extracting unit 327 may receive the uplink baseband data from the baseband processing unit 323, and may extract inherent control information required for transmission differentiation. The information extracting unit 327 may transmit the extracted inherent control information to the packetizing unit 329.

The packetizing unit 329 may perform packetization on the uplink baseband data received from the baseband processing unit 323 and may output the uplink packet generated by the packetization to the front-haul interface.

Figure 4:
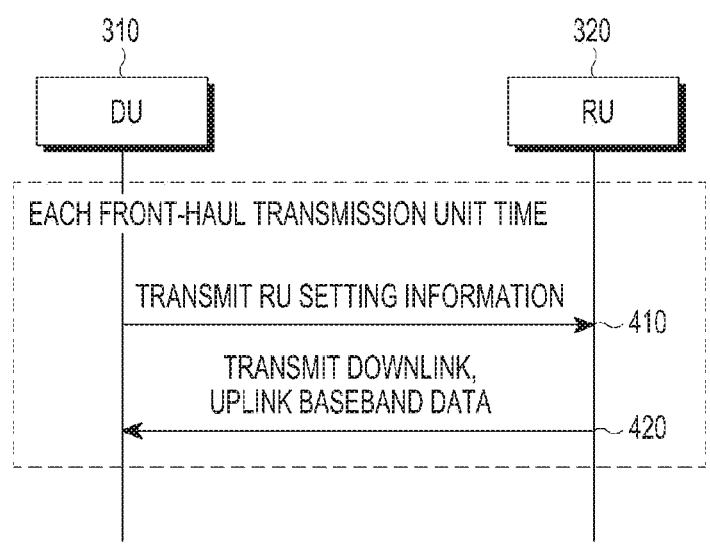
FIG. 4 is a flowchart of a method for exchanging up/downlink packets via a front-haul interface in a separate base station, according to an embodiment of the present disclosure.

FIG. 4 is a flowchart of a method for exchanging up/downlink packets via a front-haul interface in a separate base station, according to an embodiment of the present disclosure.

Referring to FIG. 4, the DU 310 transmits wireless device setting information to one or more RUs 320 through a front-haul interface at step 410. The DU 310 may transmit wireless device setting information at a predetermined cycle. The predetermined cycle may correspond to a predetermined transmission unit time.

The wireless device setting information may include setting information, and the setting information may define a functional operation of the one or more RUs 320 that is required to transmit/receive uplink/downlink baseband data every transmission unit time. The wireless device setting information may include downlink and uplink scheduling information, transmission mode information, decoding information, etc.

The minimum time unit according to the operations of the DU 310 and the RU 320 may be set in advance as a transmission unit time. The predetermined transmission unit time may be defined as a front-haul transmission time interval (FTTI). The FTTI may be determined based on a transmit time interval (TTI) of a communication system to which a front-haul interface is applied. In an LTE communication system in which the TTI is set to 1 ms, 1 ms may be used as the FTTI. When a plurality of TTIs are used in a communication system, the FTTI may be determined and used based on the minimum TTI.

The DU 310 and the RU 320 may transmit/receive an uplink packet and a downlink packet through the front-haul interface based on the previously set wireless device setting information at step 420.

The DU 310 may generate a downlink packet by packetizing the downlink baseband data, and may transmit the generated downlink packet via the front-haul interface. The RU 320 may generate an uplink packet by packetizing the uplink baseband data, and may transmit the uplink packet via the front-haul interface. The packetization operations performed in the DU 310 and the RU 320 should be performed in consideration of function split setting for application of the function split technology.

The DU 310 may receive an uplink packet via the front-haul interface and may de-packetize the received uplink packet into uplink baseband data. The RU 320 may receive an uplink packet via the front-haul interface, and may de-packetize the received downlink packet into downlink baseband data. The de-packetization operation performed in the DU 310 and the RU 320 should be performed in consideration of function split setting for application of the functional split technology.

The uplink baseband data may be baseband data obtained from the wireless signal received from a terminal by the RU 320, and the downlink baseband data may be data received from the network by the RU 320 through the back-haul interface.

The DU 310 may receive downlink baseband data from the core network via a back-haul interface, may packetize the received downlink baseband data to generate a downlink packet, and may transmit the generated downlink packet to one or more RUs 320 via a front-haul interface; this may be referred to as downlink packet transmission processing.

The DU 310 may receive an uplink packet from the one or more RUs 320 via the front-haul interface, may perform de-packetization on the received uplink packet to obtain uplink baseband data and inherent control information, and may process the uplink baseband data based on the analysis of the acquired inherent control information. The DU 310 may forward the processed uplink baseband data to the core network via the back-haul interface; this may be referred to as uplink packet reception processing.

The RU 320 may receive a downlink packet from the DU 310 via the front-haul interface, may perform de-packetization on the received downlink packet to obtain downlink baseband data, and may process the obtained downlink baseband data as a downlink wireless signal. The RU 320 may transmit the processed downlink wireless signal to one or more terminals via a wireless channel; this may be referred to as downlink packet reception processing.

The RU 320 may receive an uplink wireless signal from one or more terminals via a wireless channel, may process the uplink radio signal based on the wireless device setting information to obtain uplink baseband data, may extract inherent control information from the obtained uplink baseband data, may generate an uplink packet by packetizing the extracted inherent control information and the uplink baseband data, and may transmit the generated uplink packet to the DU 310 via the front-haul interface; this may be referred to as uplink packet transmission processing.

The wireless device setting information provided by the DU 310 and the RU 320 in order to transmit/receive an uplink/downlink packet via the front-haul interface may be updated by the DU 310 in a cycle of a preset transmission unit time.

Figure 5:
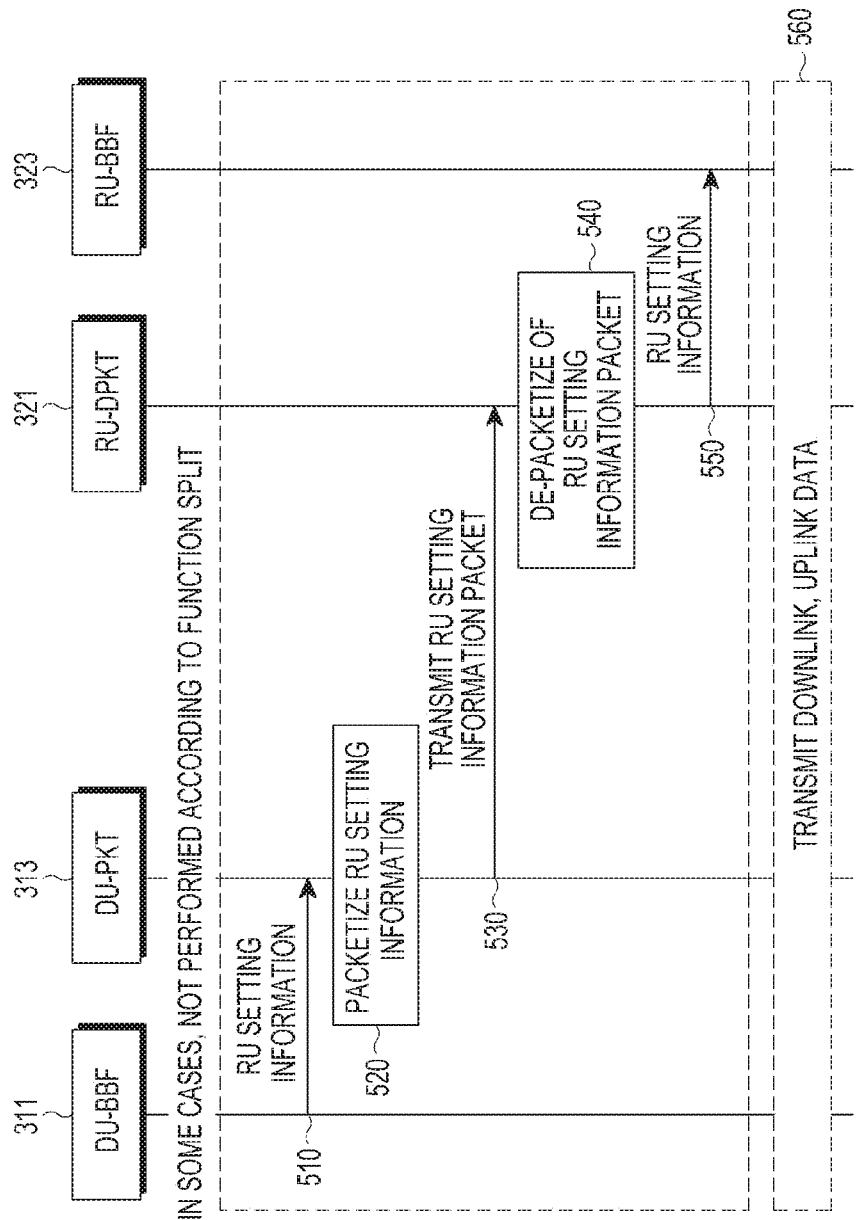
FIG. 5 is a flowchart of a method for wireless device setting information communicated via a front-haul interface in a separate base station, according to an embodiment of the present disclosure.

FIG. 5 is a flowchart of a method in which wireless device setting information is communicated via a front-haul interface in a separate base station, according to an embodiment of the present disclosure. The DU 310 may include a DU-BBF 311 and a DU-PKT 313, and the RU 320 may include an RU-DPKT 321 and an RU-BBF 323.

The DU-BBF 311 may configure wireless device setting information in consideration of the function split setting for function split between the DU 310 and the RU 320, and may transmit the configured wireless device setting information to the DU-PKT 313 at step 510.

When the functional split is set to require the transmission of the wireless device setting information, the DU-BBF 311 may adaptively determine the wireless device setting information in consideration of the function split setting. That is, the wireless device setting information may include information required for the function instructed to be performed by the RU 320 according to function split setting. The wireless device setting information may include downlink and uplink resource scheduling information, transmission mode information, information indicating a used decoding method, etc.

The DU-PKT 313 may perform packetization on wireless device setting information transmitted from the DU-BBF 311 at step 520. The DU-PKT 313 may transmit the wireless device setting information packet generated by the packetization to the RU-DPKT 321 included in the RU 320 via the front-haul interface at step 530.

The RU-DPKT 321 may receive the wireless device setting information packet from the DU-PKT 313 via the front-haul interface, and may perform de-packetization on the received wireless device setting information packet at step 540. The RU-DPKT 321 may transmit the wireless device setting information obtained by the de-packetization to the RU-BBF 323 at step 550. The RU-BBF 323 may perform a function according to function split setting using the wireless device setting information received from the RU-DPKT 321. With this purpose in mind, the wireless device setting information may include information indicating functions to be performed by the function split setting.

After the wireless device setting information is shared, the DU 310 and the RU 320 may exchange downlink baseband data and uplink baseband data via the front-haul interface at step 560.

The operation for generating and transmitting the wireless device setting information according to the above-described procedure may not be performed by the function split setting. For example, when the function split setting is made such that the RU 320 performs only the FFT and IFFT functions, the RU 320 may not require the wireless device setting information so as to perform the corresponding function. Since there is no reason for the DU 310 to transmit the wireless device setting information to the RU 320, the procedure for generating and transmitting the wireless device setting information may be omitted.

Figure 6:
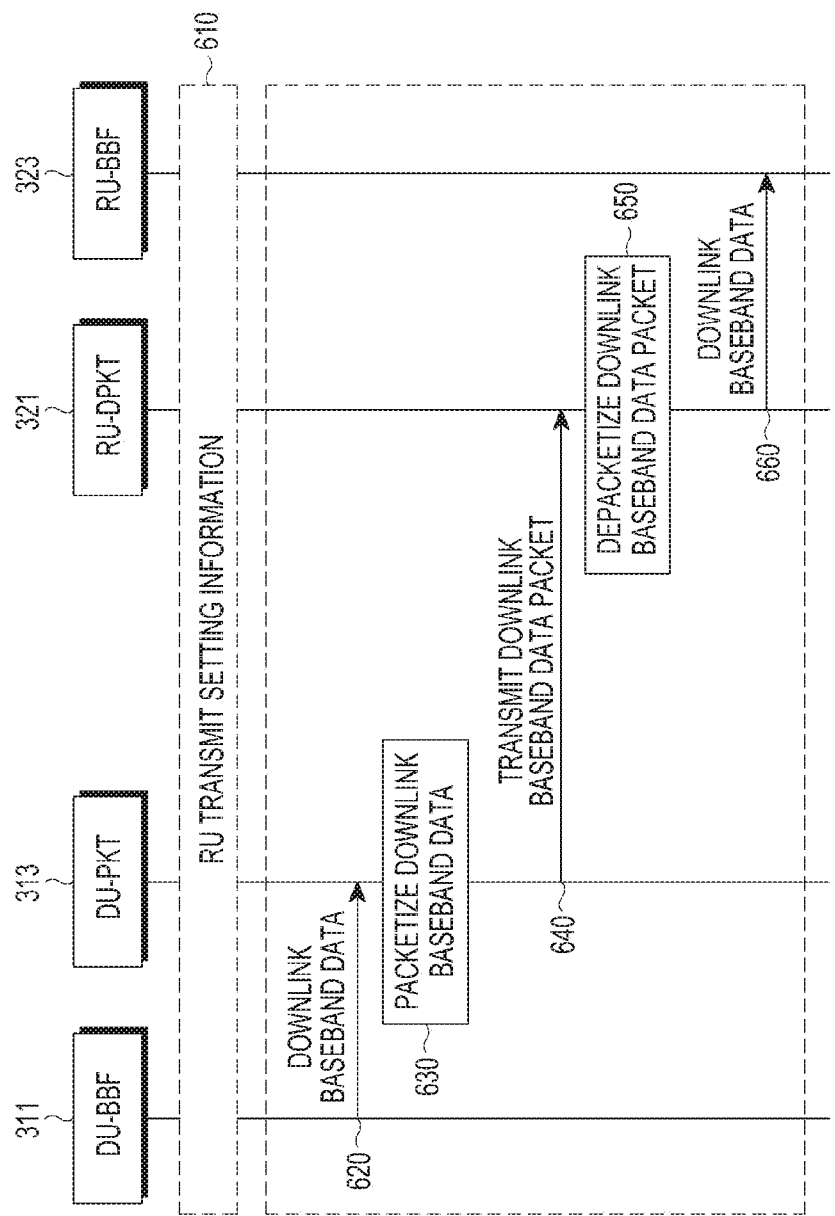
FIG. 6 is a flowchart of a method for transmitting downlink packets via a front-haul interface in a separate base station, according to an embodiment of the present disclosure.

FIG. 6 is a flowchart of a method for transmitting downlink packets via a front-haul interface in a separate base station, according to an embodiment of the present disclosure. The DU 310 may include the DU-BBF 311 and the DU-PKT 313, and the RU 320 may include the RU-DPKT 321 and the RU-BBF 323.

Referring to FIG. 6, the DU 310 may transmit wireless device configuration information to the RU 320 via the front-haul interface at step 610. The DU 310 and the RU 320 may share the wireless device setting information according to the function split setting.

The DU-BBF 311 may receive downlink baseband data from the core network via the back-haul interface, and may transmit the received downlink baseband data to the DU-PKT 313 at step 620. The DU-PKT 313 may perform packetization on the downlink baseband data transmitted from the DU-BBF 311 at step 630. The DU-PKT 313 may transmit the downlink packet (downlink baseband data packet) generated by the packetization to the RU-DPKT 321 included in the RU 320 via the front-haul interface at step 640.

The RU-DPKT 321 may receive the downlink packet from the DU-PKT 313 via the front-haul interface, and may perform de-packetization on the received downlink packet at step 650. The RU-DPKT 321 may transmit the downlink baseband data obtained by the de-packetization to the RU-BBF 323 at step 660. The RU-BBF 323 may process the downlink baseband data transmitted from the RU-DPKT 321 by the functions allocated to the RU-BBF 323 according to the function split setting. In order to process the downlink baseband data according to the function split setting, the previously shared wireless device setting information may be used.

The RU-BBF 323 may transmit a downlink radio signal generated from the downlink baseband data to at least one counterpart device, e.g., a user terminal via a designated radio channel.

Figure 7:
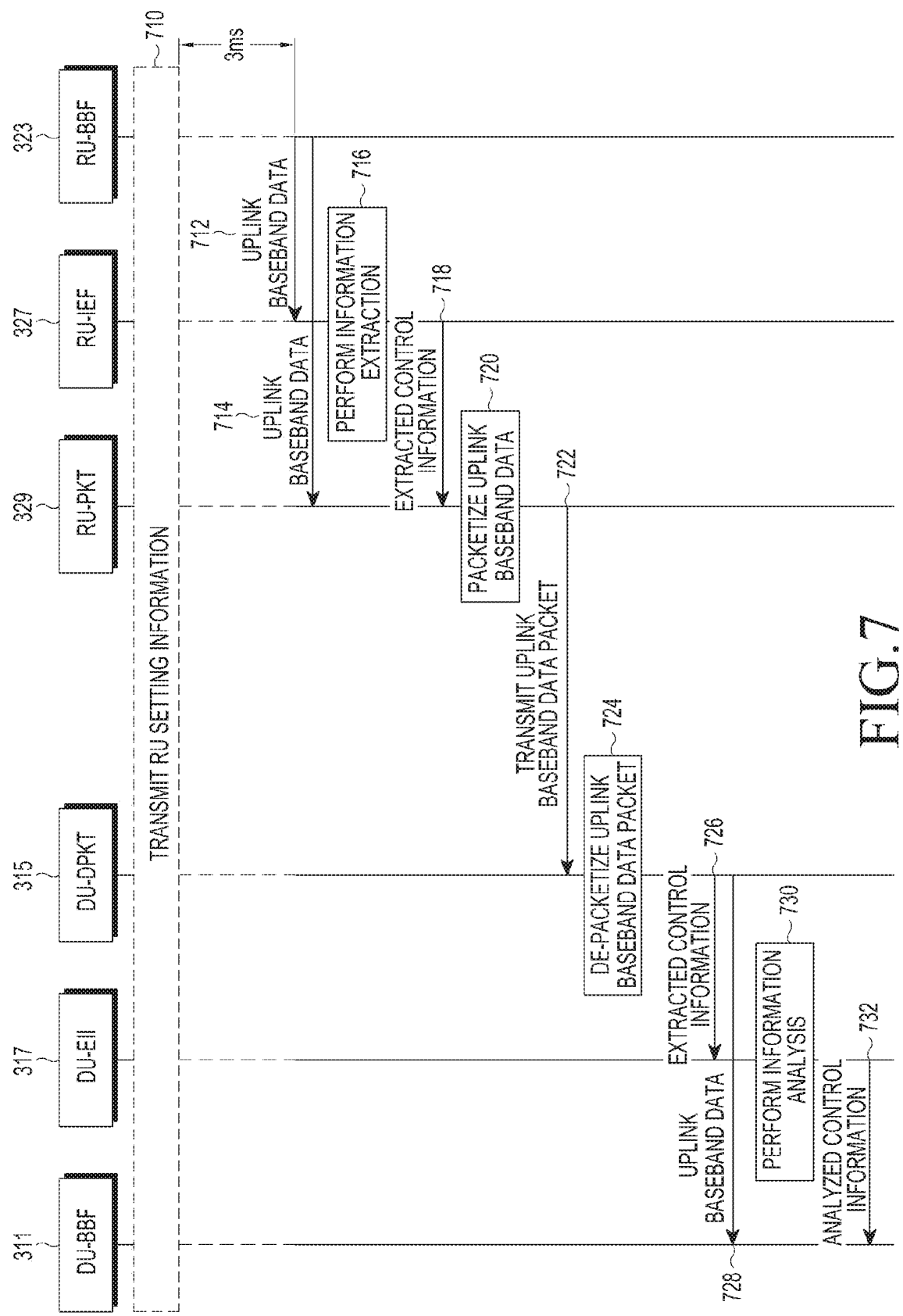
FIG. 7 is a flowchart of a method for transmitting uplink packets via a front-haul interface in a separate base station, according to an embodiment of the present disclosure.

FIG. 7 is a flowchart of a method for transmitting an uplink packet via a front-haul interface in a separate base station, according to an embodiment of the present disclosure. In this case, the DU 310 may include the DU-BBF 311 and the DU-PKT 317, and the RU 320 may include the RU-DPKT 323, the RU-IEF 327, and the RU-PKT 329.

Referring to FIG. 7, the DU 310 may transmit wireless device configuration information to the RU 320 via the front-haul interface at step 710. The DU 310 and the RU 320 may share the wireless device setting information according to the function split setting.

The RU-BBF 323 may receive an uplink wireless signal via a designated radio channel from at least one counterpart device, e.g., a user terminal. The RU-BBF 323 may process the received uplink radio signal based on the wireless device setting information to obtain uplink baseband data. The processing of the wireless signal based on the wireless device setting information may include processing corresponding to demodulation, decoding, and the like. The wireless device setting information may be received from the DU 310 in advance in the previous FTTI. For example, in the case of an LTE communication system, the uplink scheduling may be determined 3 ms before actual data transmission. In this case, the RU-BBF 323 may process uplink baseband data using the wireless device setting information received from the DU 310 3 ms before the actual data transmission.

The RU-BBF 323 may transmit the uplink baseband data to the RU-PKT 329 and/or the RU-IEF 327 at steps 712 and 714.

The RU-IEF 327 may extract inherent control information from the uplink baseband data received from the RU-BBF 323 at step 716. The RU-IEF 327 may transmit the extracted inherent control information to the RU-PKT 329 at step 718.

The RU-PKT 329 may packetize the inherent control information provided by the RU-IEF 327 and the uplink baseband data provided by the RU-BBF 323 according to packetization options at step 720. The RU-PKT 329 may transmit the uplink packet generated by the packetization to the DU-DPKT 315 via the front-haul interface at step 722.

The DU-DPKT 315 may perform de-packetization on the uplink packet received from the RU-PKT 329 via the front-haul interface at step 724. The DU-DPKT 315 may obtain the uplink baseband data and the inherent control information by de-packetization on the uplink packet. The DU-DPKT 315 may transmit the obtained inherent control information to the DU-EII 317 at step 726. In addition, the DU-DPKT 315 may transmit the obtained uplink baseband data to the DU-BBF 311 at step 728.

The DU-EII 317 may perform an operation for analyzing the inherent control information transmitted by the DU-DPKT 315 in a form usable in the DU-BBF 311 at step 730. The DU-EII 317 may provide the DU-BBF 311 with the control information analyzed in the form usable in the DU-BBF 311 at step 732.

The DU-BBF 311 may perform a baseband function based on the analyzed control information, and may process the uplink baseband data transmitted by the DU-DPKT 315. The DU-BBF 311 may transmit the uplink baseband data processed by the baseband function to the core network via the back-haul interface.

In order to process the uplink/downlink baseband data in a separate base station as described above, a transmission differentiation technology of inherent control information and a packetization/de-packetization technology for exchanging uplink/downlink packets via a front-haul interface should be provided. The transmission differentiation technology of inherent control information provides a transmission differentiation method of inherent control information in consideration of function split setting or the like.

Transmission Differentiation Method of Inherent Control Information

First, a transmission differentiation method in a communication system may extract inherent control information through additional processing, and may perform a baseband function of providing transmission differentiation of an uplink packet through a front-haul interface using the extracted inherent control information. To this end, the RU 320 may perform a basic operation of extracting the inherent control information and transmitting the inherent control information to the DU 310. The DU 310 may analyze the inherent control information collected from the RU 320, and may perform a basic operation of processing the baseband function using information according to the analysis.

The inherent control information extraction function (RU-IEF 327) may receive uplink baseband data related to the extraction from the baseband function (RU-BBF 323) for extraction of the inherent control information. The RU-IEF 327 may extract the inherent control information using the uplink baseband data received from the RU-BBF 323. The RU-IEF 327 may transmit the extracted inherent control information to the packetization function (RU-PKT 329) in order to differentiate the transmission for the uplink packet. The RU-PKT 329 may perform differentiated packetization based on the received inherent control information, and may transmit the uplink packet generated by performing the differentiated packetization to the DU 310 via the front-haul interface.

Figure 8:
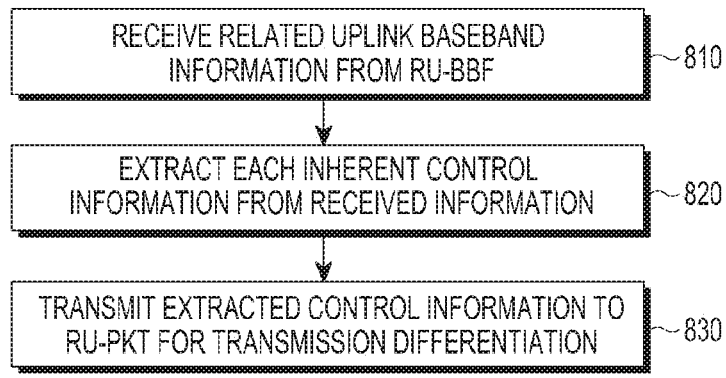
FIG. 8 is a flowchart of a method for the extraction of control information, which is present in an RU of a separate base station, according to an embodiment of the present disclosure.

FIG. 8 is a flowchart of a method for the extraction of control information, which is present in an RU of a separate base station, according to an embodiment of the present disclosure. In the following, it is assumed that the corresponding operation is performed by the RU-IEF 327.

Referring to FIG. 8, the RU-IEF 327 may receive uplink baseband information related to reception of uplink baseband data from the RU-BBF 323 at step 810. The RU-IEF 327 may extract the inherent control information from uplink baseband information provided from the RU-BBF 323 at step 820. The uplink baseband information provided from the RU-BBF 323 may correspond to the uplink baseband data. The RU-IEF 327 may transmit the extracted inherent control information to the RU-PKT 329 for transmission differentiation at step 830.

Figure 9:
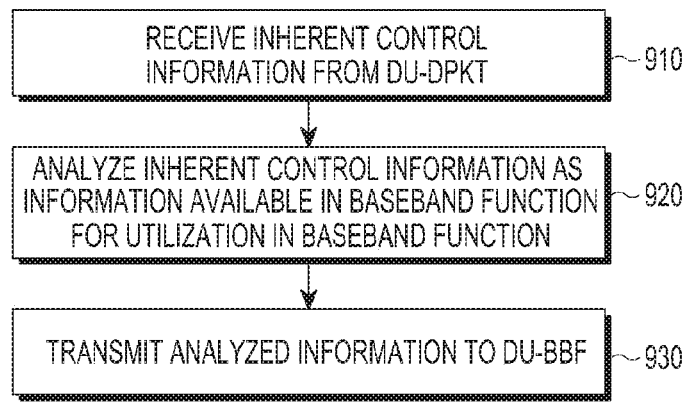
FIG. 9 is a flowchart of a method for the analysis of control information, which is present in a DU of a separate base station, according to an embodiment of the present disclosure.

FIG. 9 is a flowchart of a method for the analysis of control information, which is present in a DU of a separate base station, according to an embodiment of the present disclosure. In the following, it is assumed that the corresponding operation is performed by the DU-EII 317.

Referring to FIG. 9, the DU-EII 317 may receive inherent control information from the DU-DPKT 315 at step 910. The DU-EII 317 may analyze the inherent control information provided from the DU-DPKT 315 into a form usable in the baseband function at step 920. The DU-EII 317 may transmit the inherent control information analyzed in the form usable in the baseband function to the DU-BBF 311 at step 930.

In order to apply the transmission differentiation technology on an uplink, it is necessary to consider function split setting according to function split. That is, the transmission differentiation technology on the uplink differentially applies the uplink transmission on the front-haul interface according to the function of the RU 320 depending on the function split.

The transmission differentiation method may provide a transmission differentiation method for an uplink packet on a front-haul interface in consideration, e.g., function split in an LTE communication system. That is, an uplink decoding result transmission differentiation method or a transmission differentiation method of uplink control information multiplexed on the PUSCH may be provided as a transmission differentiation method.

Uplink Decoding Result Transmission Differentiation Method

A transmission differentiation method of differentially applying uplink transmission on a front-haul interface based on a decoding result in an uplink may be used. To this end, it may be assumed that the function split is set such that an RU 320 performs all uplink physical layer functions (Intra L2, MAC-PHY, PHY 3, PHY 2, PHY 1, and RF illustrated in FIG. 2).

Specifically, the RU-BBF 323 may provide the RU-IEF 327 with uplink MAC PDUs decoded from a wireless signal received via a wireless channel and uplink scheduling information related to each of the MAC PDUs. The RU-IEF 327 may extract the decoding result of each terminal that has performed the uplink transmission using the decoded uplink MAC PDUs provided from the RU-BBF 323 and the uplink scheduling information associated with each of the MAC PDUs. The RU-IEF 327 may transmit the extracted decoding result to the RU-PKT 329 for differentiated uplink transmission in consideration of the function split setting on the front-haul interface. The RU-PKT 329 may packetize information on the decoding result in consideration of transmission differentiation, and may transmit information on the packetized decoding result to the DU 310 via the front-haul interface. The RU 320 may provide differentiated transmission of the decoding result of each terminal, which has performed the uplink transmission, to the DU 310 in consideration of the function split.

The DU-DPKT 315, which includes the DU 310, may perform de-packetization on an uplink packet received via the front-haul interface, and may obtain information on the decoding result by the de-packetization. The DU-DPKT 315 may transmit information on the obtained decoding result to the DU-EII 317. The DU-EII 317 may perform analysis of error indicator information based on the information on the decoding result transmitted from the DU-DPKT 315. The error indicator information corresponds to information, which can be utilized in the MAC layer of the baseband function (BBF). The DU-EII 317 may provide error indicator information to the DU-BBF 311. The DU-BBF 311 may process the uplink baseband data provided from the DU-DPKT 315 in consideration of the error indicator information, and may transmit the uplink baseband data to the core network via the back-haul interface.

Transmission Differentiation Method of Uplink Control Information Multiplexed on PUSCH A transmission differentiation method of differentially applying uplink transmission on a front-haul interface to uplink control information multiplexed on a PUSCH may be used. To this end, it may be assumed that the RU 320 is set to perform some uplink physical layer functions (PHY 3, PHY 2, PHY 1, and RF illustrated in FIG. 2). That is, the transmission differentiation method is applicable when wireless resource de-mapping of the uplink control information multiplexed on the PUSCH is enabled and before the decoding of uplink control information is completed.

More specifically, the RU-BBF 323 may obtain uplink baseband data and scheduling information of multiplexed uplink control information from a radio signal received via a wireless channel (e.g., PUSCH). The RU-BBF 323 may transmit the uplink baseband data and the scheduling information to the RU-IEF 327. The RU-IEF 327 may extract uplink control information multiplexed on the PUSCH using the uplink baseband data and the scheduling information. The RU-IEF 327 may transmit the extracted uplink control information to the RU-PKT 329 for transmission differentiation.

For example, in the case of the PHY 3, the RU-IEF 327 may extract soft-decision information of a resource element, to which the uplink control information is transmitted, as multiplexed uplink control information, and may transmit the soft-decision information to the RU-PKT 329. In the case of the PHY 2, the RU-IEF 327 may extract IQ (in-phase component, quadrature component) symbol information of the resource element, to which the uplink control information is transmitted, as multiplexed uplink control information, and may transmit the IQ symbol information to the RU-PKT 329.

The RU-PKT 329 may packetize the uplink control information extracted by the RU-IEF 327 in consideration of transmission differentiation, and may transmit the packetized uplink control information to the DU 310 via the front-haul interface. The RU 320 may provide differentiated transmission of the uplink control information multiplexed on the PUSCH in consideration of function split.

The DU-DPKT 315, which includes the DU 310, may perform de-packetization on the uplink packet received via the front-haul interface, and may obtain uplink control information by the de-packetization. The DU-DPKT 315 may transmit the obtained the uplink control information to the DU-EII 317. The DU-EII 317 may perform the analysis of the uplink control information received from the DU-DPKT 315 into information capable of being utilized in the BBF. The DU-EII 317 may transmit information, which is capable of being utilized in the BBF and is analyzed from the uplink control information, to the DU-BBF 311.

For example, in the case of the PHY 3, the DU-EII 317 may transmit information on the soft-demodulation result of each symbol, which is capable of being decoded in RU-BBF 323, to the RU-BBF 323. In the case of the PHY 2, DU-EII 317 may transmit symbol information on a form, which is capable of performing layer de-mapping and demodulation in the RU-BBF 323, to the RU-BBF 323.

The DU-BBF 311 may process the uplink baseband data provided from the DU-DPKT 315 in consideration of information transmitted from the DU-EII 317, and may then transmit the uplink baseband data to the core network via the back-haul interface.

Packetization and De-Packetization Operations

Generally, in a packet network, since a switching delay may increase as a packet size increases, it may be considered that all information is transmitted as a single packet without packetization. In this case, it may be assumed that packet loss has occurred as a result of a delay in terms of performance degradation as well as time-out or link failure due to late arrival of the packet. Loss of main information, such as control information included in the corresponding packet occurs, may cause the reliability of the communication system to deteriorate.

Therefore, in order to obtain a performance gain in terms of delay and reliability in consideration of the required QoS of information transmitted in a packet-based front-haul network, it is necessary to properly packetize and transmit the front-haul transmission data. The methods and apparatuses described herein enable differentiated transmission of main information through packetization.

Two methods for packetizing front-haul transmission data are now herein described.

A first method is a QoS-wise packetization method, and a second method is a user-wise packetization method.

The QoS-wise packetization method is a method of performing packetization by differentiating QoS of data, such as delay and reliability. System information, uplink and downlink feedback information (e.g., acknowledgment information), and uplink and downlink control information in an LTE communication system may require high QoS. In addition, high QoS may be required depending on services such as an emergency message in vehicle to everything (V2X) technology.

The QoS-wise packetization method collects information requiring high QoS and performs packetization so that the corresponding packet can obtain a performance gain in terms of delay and reliability through transmission differentiation in terms of transmission technology.

Additional reliability can be obtained by applying a high coding rate to the corresponding packet or by repetitively transmitting the same packet. Further, it is possible to obtain a gain in terms of delay by transmitting the corresponding packet to a link having a good transmission characteristic or by giving a priority to the corresponding packet at the time of forwarding. The QoS-wise packetization method may be applied in consideration of multi-level QoS. The packet generated by the QoS-wise packetization method will be referred to as a QoS-important packet.

The user-wise packetization method is a method of dividing data into terminals and performing packetization. For example, information such as downlink and uplink data, downlink and uplink control information in the LTE communication system can be divided into terminals. When data of all terminals are packetized and transmitted at once, a transmission failure of one packet may lead to the failure of data transmission for all the terminals. In comparison, the user-wise packetization method is advantageous in that high reliability can be obtained. The user-wise packetization method may facilitate data processing when data for each terminal is to be processed as in the case in which, at the time of handover of a terminal, the data of the corresponding terminal is transferred to a target cell for handover. The packet generated by the user-wise packetization method will be referred to as a terminal-related packet.

In the case of information transmitted in a front haul, the service qualities, such as the type of information, the capacity of the front-haul required for transmission of information, required reliability, and delay, are changed according to function split setting. Therefore, in order to achieve efficient packet transmission in the packet-based front-haul interface, it is necessary to properly apply one of the two packetization methods described above.

A mixed packetization method in which the two packetization methods (the QoS-wise packetization method and the user-wise packetization method) may be applied for the system, through a packetization option.

In the mixed packetization method, since the two packetization methods are properly applied according to the front-haul information, various kinds of packets can be generated according to the kind of the front-haul information and an applied packetization method.

A basic packet structure shared by all packets of a packet-based front-haul interface can be used regardless of a packetization method and a packet type in order to efficiently perform packetization and de-packetization of a packet. All the packets of the packet-based front-haul interface have to be used have the same basic packet structure regardless of the packetization method and the packet type.

Figure 10:
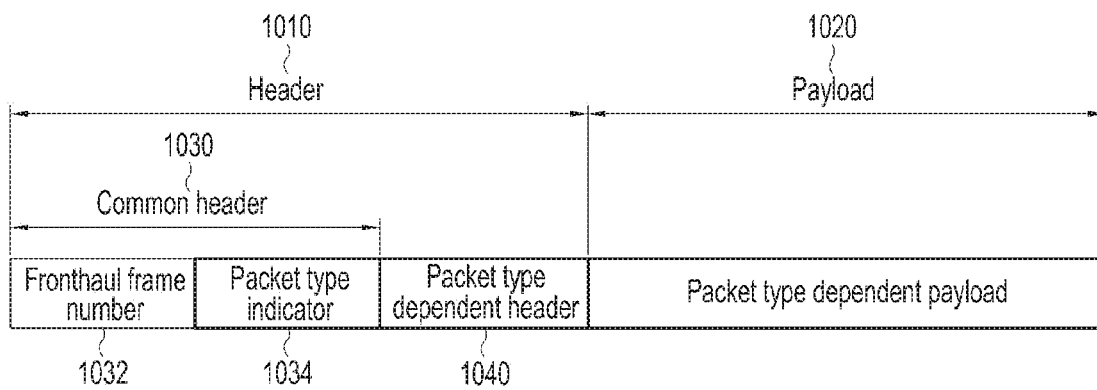
FIG. 10 is a flowchart of a method for a basic packet structure for performing packetization and de-packetization functions, according to an embodiment of the present disclosure.

FIG. 10 is a diagram of a basic packet structure for performing packetization and de-packetization functions, according to an embodiment of the present disclosure.

Referring to FIG. 10, a basic packet structure includes a header 1010 and a payload 1020. The header 1010 may include a common header 1030 and a packet type-dependent header 1040. In the common header 1030, common information, which is irrelevant to the packet type, may be recorded, and in the header for each packet type, information, the configuration of which varies depending on the packet type, may be recorded. The configuration of the payload 1020 may also be changed depending on the packet type.

The common information recorded in the common header 1030 may include a front-haul frame number 1032, a packet type indicator 1034, etc. The front haul frame number 1032 indicates which FTTI information the corresponding packet contains, and the packet type indicator 1034 indicates a packet type recorded in the payload 1020 of the packet. The front-haul frame number 1032 may be indicated using a system frame number.

In the case of an LTE communication system, a front-haul frame number may be expressed using a system frame number and a sub-frame number of a corresponding system.

When a plurality of TTIs coexist in one sub-frame in a wireless communication system, a front-haul frame number may be expressed by information such as a system frame number, a sub-frame number, a TTI index, and a TTI length.

Since a packet type indicator indicates the packet type of the corresponding packet, it is possible to determine whether transmission differentiation in a transmission technology is performed through the packet type indicator. On the other hand, in the case of CPRI or ORI, it may be difficult to distinguish information included in each IQ symbol in the form of an IQ symbol transmitted in the front-haul information. In addition, since transmission differentiation is not considered, an indicator for distinguishing the type of data is not included in the frame structure, so that it is difficult to perform transmission differentiation. In addition, through the packet type indicator, the de-packetization function may identify the type of packet and may perform de-packetization on packet type-dependent header information and payload packet type-dependent payload. In the case of the packet type-dependent header information, since the information required in the header differs according to the packet type and function split setting, header information suitable for each situation is included.

In the case of the payload, different data are transmitted depending on the packet type, and the type and payload structure of data to be transmitted may be changed according to the function split setting. Therefore, the de-packetization function performs the de-packetization to be suitable for each situation using the packet type-dependent header information.

A packetization option can be used for the application of a mixed packetization method and for efficient packetization and de-packetization. The packetization option serves to set two packetization methods such as a QoS-wise packetization method and a user-wise packetization method, such that the packetization methods can be properly applied. The packetization option includes the following contents for the operation setting of the mixed packetization method:

- an application method of the mixed packetization method (whether QoS-wise packetization method or user-wise packetization method of each front-haul information is applied);
- a definition of a packetization operation according to function split setting;
- a definition of a QoS level of front-haul information when considering multi-level QoS-wise packetization; and
- a definition of detailed operation setting of QoS-wise packetization method and user-wise packetization method.

The operations of packetization and de-packetization functions of the DU 310 and RU 320 and the types and configurations of a packet to be generated will differ from each other depending on the packetization option.

A detailed description of the mixed packetization method will be described using examples of the packetization option.

The mixed packetization method may be applicable to both a general communication system and a function split method. However, for convenience of explanation, an LTE communication system, in which the function split setting shown in FIG. 2 is assumed.

Packetization Option (Example 1)

The packetization option may define a QoS-important packet and a terminal-related packet. The QoS-important packet may be a packet generated by performing packetization based on a QoS-wise packetization method. The terminal-related packet may be a packet generated by performing packetization based on a user-wise packetization method.

The packetization option may define whether to packetize uplink/downlink baseband data to be transmitted by dividing the data based on QoS, or by dividing the data based on a user. That is, the packetization option may be set such that a QoS-wise packetization method may be applied for baseband data for which a user-dependent (or terminal-dependent) split is impossible or unnecessary, and the user-wise packetization method may be applied for baseband data for which a user-dependent (or terminal-dependent) is possible or necessary.

Packetization Option Example 1 may designate RU setting information, control information on downlink and uplink, system information, etc. as a target (type of baseband data) to which the QoS-wise packetization method is applied, and may designate user-dependent downlink and uplink data, downlink scheduling-related control information, etc. as a target (type of baseband data) to which the user-wise packetization method is applied.

The types of baseband data according to the packetization option described above and the types of a packet generated through packetization may have the following mapping relationship:

- QoS-important packet: RU setting information, some main information on uplink/downlink baseband data (control information on downlink and uplink, system information); and
- terminal related packet: remaining information on downlink and uplink baseband data (user-dependent downlink and uplink data and downlink scheduling-related control information).

Figure 11:
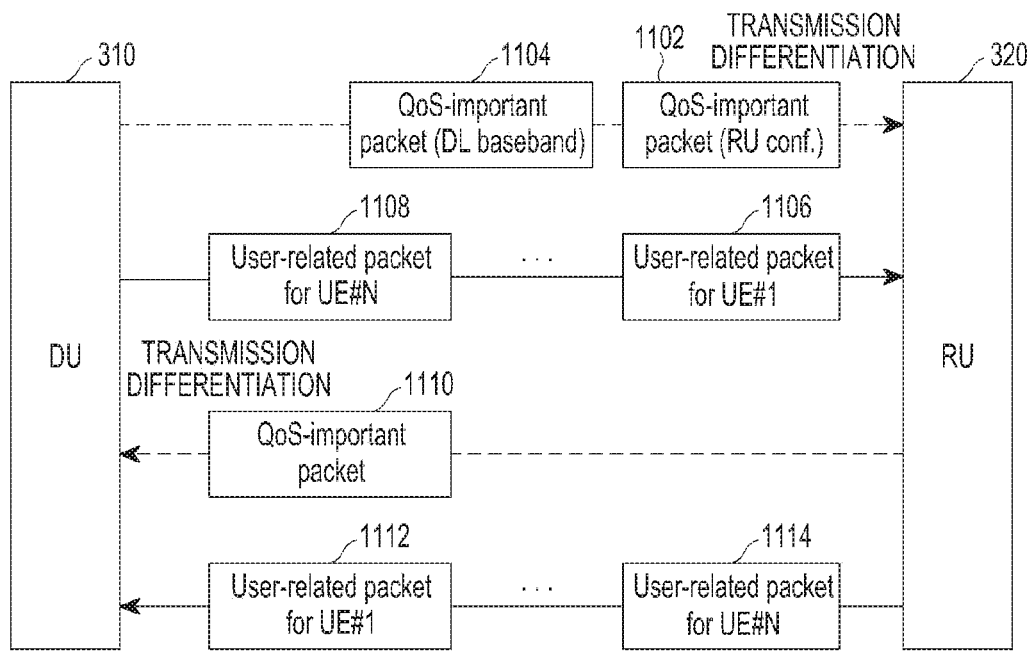
FIG. 11 is a flowchart of a method for a packet transmission procedure based on a packetization option, according to an embodiment of the present disclosure.

FIG. 11 is a flowchart of a method for a packet transmission procedure based on a packetization option, according to an embodiment of the present disclosure.

Referring to FIG. 11, downlink transmission may include transmission of a QoS-important packet for which transmission differentiation is considered and transmission of a terminal-related packet for which transmission differentiation is not considered. To this end, the packetization option applies the QoS-wise packetization method to the transmission of a QoS-important packet for which transmission differentiation is considered, and applies a user-wise packetization method to the transmission of a terminal-related packet for which transmission differentiation is not considered.

The DU 310 may packetize RU setting information based on the QoS-wise packetization method and may transmit the QoS-important packet generated by the packetization to the RU 320 at step 1102. The DU 310 may packetize some main information on the downlink baseband data (control information and system information on the downlink) based on the QoS-wise packetization scheme, and may transmit a QoS-important packet generated by the packetization to the RU 320 at step 1104. The DU 310 may apply transmission differentiation for the transmission of a QoS-important packet.

The DU 310 may packetize the remaining information on the downlink baseband data for a first user (UE #1) based on the user-wise packetization method (downlink data of UE #1 and downlink scheduling-related control information), and may transmit a terminal-related packet generated by the packetization to the RU 320 at step 1106. The DU 310 may packetize the remaining information on the downlink baseband data for an $N^{th}$ user (UE # N) (downlink data of UE # N and downlink scheduling-related control information) based on the user-wise packetization method, and may transmit a terminal-related packet generated by the packetization to the RU 320 at step 1108.

The DU 310 may perform a downlink transmission procedure for generating a downlink packet (a QoS-important packet or a terminal-related packet), and transmitting the generated downlink packet to the RU 320 via the front-haul interface.

The RU 320 may packetize some main information on the uplink baseband data (control information and system information on the uplink) based on the QoS-wise packetization method, and may transmit the generated QoS-important to the DU 310 at step 1110. The RU 320 may apply transmission differentiation for the transmission of a QoS-important packet.

The RU 320 may packetize the remaining information of the uplink baseband data for the first user (UE #1) (uplink data of UE #1) based on the user-wise packetization method, and may transmit the terminal-related packet generated by the packetization to the DU 310 at step 1112. The RU 320 may packetize the remaining information on the uplink baseband data for the $N^{th}$ user (UE # N) (uplink data of the UE # N) based on the user-wise packetization method, and may transmit a terminal-related packet generated by the packetization to the DU 310 at step 1114.

The RU 320 may perform an uplink transmission procedure for generating an uplink packet (a QoS-important packet or a terminal-related packet) and transmitting the generated uplink packet to the DU 310 via the front-haul interface.

Table 1 below includes a packet type indicator (value) based on Packetization Option Example 1.

TABLE 1

| Value | Packet Type |
|---|---|
| 000 | QoS-important packet including RU setting information |
| 001 | QoS-important packet including some main information of downlink and uplink baseband data |
| 010 | Terminal-related packet including remaining information of downlink and uplink baseband data |
| 011-111 | Reserved (usable for multi-level QoS-important packet) |

The packet type indicator defined in Table 1 may be information, which indicates a data type included in the payload of a QoS-important packet or a terminal-related packet. The packet type indicator may be included in header information on a QoS-important packet or a terminal-related packet.

Table 2 below includes detailed the transmission information of a front-haul that is included in each packet according to a packetization option.

TABLE 2

| | Intra L2 | MAC-PHY | PHY3 | PHY2 |
|---|---|---|---|---|
| RU setting information (QoS-important packet) | DL/UL resource allocation information DL/UL transmission information DL reference signal sequence information | DL/UL resource allocation information DL/UL transmission information DL reference signal sequence information DL redundancy version | DL/UL resource allocation information DL/UL transmission information DL reference signal sequence information | DL/UL resource allocation information |
| DL baseband data (QoS-important packet) | MIB/SIB | MIB/SIB | Coded MIB/SIB Coded UL ACK/NACKs | IQ symbols for PBCH IQ symbols for PCFICH IQ symbols for PHICH IQ symbols for RS |
| DL baseband data (Terminal-related packet) | MAC PDU DCI | MAC PDU DCI | Codewords Coded DCI | IQ symbols on PDSCH IQ symbols on PDCCH |
| UL baseband data (QoS-important packet) | UL decoding results* Scheduling requests CSI reports Meas. from SRS Meas. from PRACH* | UL decoding results* Scheduling requests CSI reports DL ACK/NACKs Meas. from SRS Meas. from PRACH | Soft-demod. results for UCI on PUSCH* Soft-demod. results on PUCCH Meas. from SRS Meas. from PRACH | IQ symbols for UCI on PUSCH* IQ symbols for PUCCH IQ symbols for SRS IQ symbols for PRACH |
| UL baseband data (Terminal-related packet) | MAC PDU | MAC PDU | Soft-demod. results on PUSCH | IQ symbols on PUSCH |

Table 2 includes detailed transmission information on the front-haul that indicates detailed split for the type of information or data included in the payload of the uplink/downlink packet (a QoS-important packet or a terminal-related packet) transmitted through the front-haul.

That is, Table 2 includes information on respective layers (intra L2, MAC-PHY, PHY3, and PHY2), which correspond to each of RU setting information classified as baseband data to be transmitted by a QoS-important packet, some main information on downlink baseband data, and some main information on uplink baseband data. Table 2 includes the remaining information on respective (Intra L2, MAC-PHY, PHY3, and PHY2), which correspond to each of the remaining information on downlink baseband data classified into baseband data to be transmitted by a terminal-related packet and the remaining information on the uplink baseband data.

Figure 12:
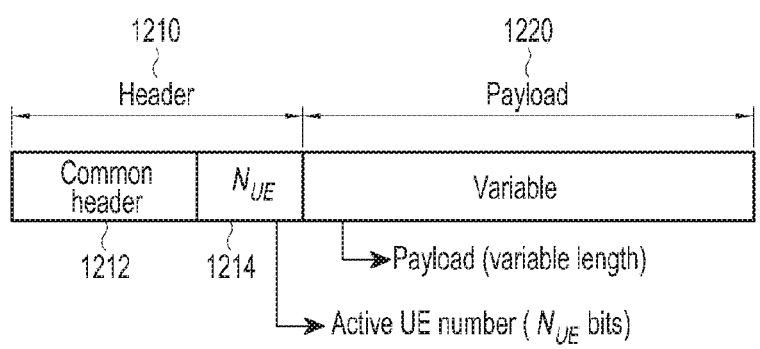
FIG. 12 is a diagram of a frame structure of a quality of service (QoS)-important packet configured for transmission of RU-setting information, according to an embodiment of the present disclosure.

FIG. 12 is a diagram of a frame structure of a QoS-important packet configured for transmission of RU-setting information, according to an embodiment of the present disclosure.

Referring to FIG. 12, a QoS-important packet may include a header 1210 and a payload 1220. The header 1210 may include a common header 1212 and a packet type-dependent header 1214. In the common header, common information, which is irrelevant to the packet type, may be recorded, and the packet type-dependent header information 1214 may include information on the number of active terminals (NUE) for which current RU setting information is requested.

In an LTE communication system, for example, a terminal on which downlink or uplink transmission is scheduled, a terminal on which transmission of downlink or uplink control information exists, or the like may be defined as an active terminal. The active terminal may be a terminal, which requires RU setting information for communication with a terminal in the RU 320. The number of active terminals is expressed in bits, and the number of bits may be set in consideration of the system capacity of the communication system.

The payload 1220 may include RU setting information of active terminals and RU setting information that is not related to a terminal.

In the RU setting information of the active terminals, the format of each piece of information may be defined according to the function split setting and the transmission type of the user. For example, in an LTE communication system, the format of the RU setting information may be defined in a form similar to downlink control information including scheduling and transmission-related information of active terminals. Therefore, the RU setting information of each active terminal includes a terminal ID for explicitly informing which terminal the setting information of the corresponding information is related to, a format indicator of the corresponding information, and the setting contents of the corresponding format.

The RU setting information, which is irrelevant to the terminal, may be defined as a format having a fixed size according to function split setting and a packetization option. For example, since an LTE communication system includes setting information related to a downlink reference signal, a format capable of expressing the setting of the corresponding information may be defined and used.

Figure 13:
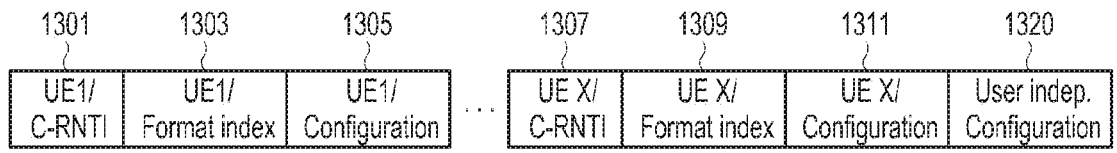
FIG. 13 is a diagram of a structure of a payload constituting a frame of a QoS-important packet configured for transmission of RU-setting information, according to an embodiment of the present disclosure.

FIG. 13 is a diagram of a payload constituting a frame of a QoS-important packet configured for transmission of RU-setting information, according to an embodiment of the present disclosure.

Referring to FIG. 13, the payload of the QoS-important packet may include RU setting information of active terminals and RU setting information, which is irrelevant to a terminal. The RU setting information of the active terminals may include C-RNTIs 1301 and 1307, format indexes 1303 and 1309, and configuration information 1305 and 1311 for each user. The RU setting information, which is irrelevant to the terminals, may include user-independent configuration information 1320.

The de-packetization function may classify and obtain RU setting information of each of the active terminals using information on the number of active terminals that is included in the header, or may also classify and obtain RU setting information, which is irrelevant to the terminals.

Figure 14:
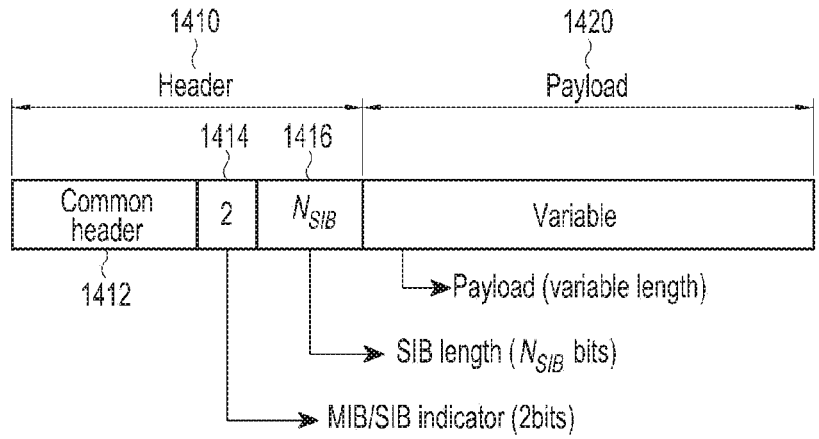
FIG. 14 is a diagram of a frame structure of a QoS-important packet configured for transmission of some main information of downlink baseband data, according to an embodiment of the present disclosure.

FIG. 14 is a diagram of a QoS-important packet configured for transmission of some main information of downlink baseband data, according to an embodiment of the present disclosure.

Referring to FIG. 14, a QoS-important packet may include a header 1410 and a payload 1420. The header 1410 may include a common header 1412 and a packet type-dependent header.

The packet type-dependent header may include an indicator (master information block (MIB)/system information block (SIB) indicator, 2 bits) 1414 indicating whether system information is included and information defining the length of system information (SIB length, NSIB bits) 1416. The indicator 1414 may indicate whether the corresponding packet includes system information. The length of system information 1416 may indicate the size of the changed system information for de-packetization. In this case, system information, which is not frequently changed, may be implemented to be transmitted only when changed. Due to this, transmission overhead can be reduced.

In the case of an LTE communication system, an MIB and an SIB may be transmitted as system information. Since the corresponding information is not frequently transmitted, the information may be expressed by an indicator including system information as in Table 3 below.

TABLE 3

| Value | Description |
| --- | --- |
| 00 | Neither MIB nor SIB exists |
| 01 | Only MIB exists |
| 10 | Only SIB exists |
| 11 | Both MIB and SIB exist |

According to Table 3, because the SIB is not information having a fixed size, de-packetization may be enabled by explicitly informing of the size of the corresponding information through the length information of the system information.

The payload 1420 may include system information and control information. Each piece of the information may be changed as to whether to transmit or the type according to function split setting. Therefore, the structure of the payload may be changed according to the function split setting.

Hereinafter, in the following description of the payload structure, it is assumed that system information is transmitted. However, if the system information is not transmitted, the payload portion may not be transmitted as well.

Figure 15:
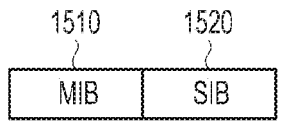
FIG. 15 is a diagram of a payload structure of a QoS-important packet including some main information of downlink baseband data when functions corresponding to Intra L2 and media access control (MAC)-physical layer (PHY) are performed in a DU of an LTE communication system, according to an embodiment of the present disclosure.

FIG. 15 is a diagram of a payload structure of a QoS-important packet including some main information of downlink baseband data in the case where functions corresponding to Intra L2 and MAC-PHY are performed in a DU of an LTE communication system, according to an embodiment of the present disclosure.

Referring to FIG. 15, when the DU 310 processes a function corresponding to some layers (Intra L2 and MAC-PHY) according to function split setting, the payload of a QoS-important packet, which includes some main information of downlink baseband data, may include an MIB 1510 and an SIB 1520.

At the time of de-packetization, the RU 320 may obtain the SIB 1520 using the length information of the system information after obtaining the MIB 1510 having a fixed size. For example, the length of the SIB 1520 may be obtained by subtracting the fixed length of the MIB 1510 from the length information of the system information.

Figure 16:
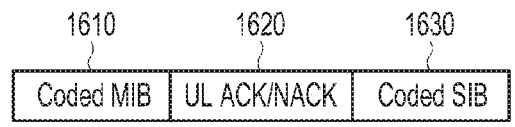
FIG. 16 is a diagram of a payload structure of a QoS-important packet including some main information of downlink baseband data when functions corresponding to Intra L2, MAC-PHY, and PHY3 are performed in a DU of an LTE communication system, according to an embodiment of the present disclosure.

FIG. 16 is a diagram of a payload structure of a QoS-important packet including some main information of downlink baseband data in the case where functions corresponding to Intra L2, MAC-PHY, and PHY3 are performed in a DU of an LTE communication system, according to an embodiment of the present disclosure.

Referring to FIG. 16, when the DU 310 processes a function corresponding to some layers (Intra L2, MAC-PHY, and PHY3) according to the function split setting, the payload of a QoS-important packet, which includes some main information of downlink baseband data, may include a coded MIB, uplink feedback information (UL acknowledge (ACK)/negative-ACK (HACK)) 1620, and a coded SIB 1630.

At the time of de-packetization, the RU 320 may obtain uplink feedback information (acknowledgment information) 1620 after obtaining the encoded MIB 1610 having a fixed size. In the case of the uplink feedback information 1620, since the number of corresponding information items can be known through RU setting information, it is possible to determine the start position of the coded SIB 1630. That is, the start position of the SIB 1630 coded in the payload may be obtained using the length information of the system information of the header, the fixed size of the coded MIB 1610, and the number of uplink feedback information items (acknowledgment information) 1620 confirmed through RU setting information.

Figure 17:
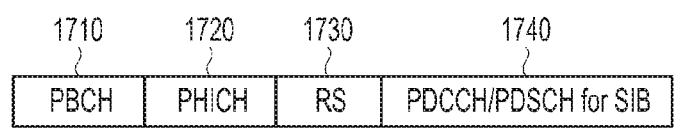
FIG. 17 is a diagram of a payload structure of a QoS-important packet including some main information of downlink baseband data when functions corresponding to Intra L2, MAC-PHY, PHY3, and PHY2 are performed in a DU of an LTE communication system, according to an embodiment of the present disclosure.

FIG. 17 is a diagram of a payload structure of a QoS-important packet including some main information of downlink baseband data in the case where functions corresponding to Intra L2, MAC-PHY, PHY3, and PHY2 are performed in a DU of an LTE communication system, according to an embodiment of the present disclosure.

Referring to FIG. 17, when the DU 310 processes a function corresponding to some layers (Intra L2, MAC-PHY, PHY3, and PHY2) according to the function split setting, the payload of a QoS-important packet, which includes some main formation of the downlink baseband data, may include a physical broadcast channel (PBCH) 1710, a physical hybrid-automatic repeat request (ARQ) indicator channel (PHICH) 1720, a reference signal (RS) 1730, and a physical downlink control channel (PDCCH)/PDSCH 1740. The PDCCH and PDSCH are for the SIB.

At the time of de-packetization, the RU 320 may obtain PBCH IQ symbol information 1710 having a fixed size, and then obtain PHICH IQ symbol information 1720. In the case of the PHICH IQ symbol information 1720, since it is possible to know the length of the corresponding information through the RU setting information, it is possible to determine the start position of the reference signal IQ symbol information 1730. In the case of the reference signal IQ symbol, since the number of resource elements used in the reference signal is known based on the RU setting information, it is possible to determine the start position of the PDCCH/PDSCH IQ symbol information 1740 for the SIB after the corresponding information. That is, PDCCH/PDSCH IQ symbol information 1740 for the SIB can be classified from the corresponding start position by further considering the length information of system information of the header.

Figure 18:
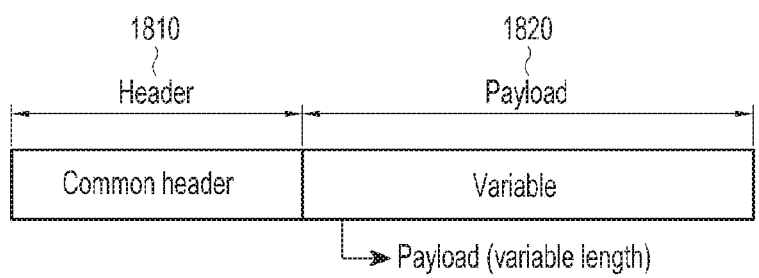
FIG. 18 is a diagram of a frame structure of a QoS-important packet configured for transmission of some main information of uplink baseband data, according to an embodiment of the present disclosure.

FIG. 18 is a diagram of a frame structure of a QoS-important packet configured for transmission of some main information of uplink baseband data, according to an embodiment of the present disclosure.

Referring to FIG. 18, a QoS-important packet may include a header 1810 and a payload 1820. The header 1810 does not have any additionally requested packet type-dependent header information.

FIG. 19 is a diagram of a payload structure of a QoS-important packet including some main information of uplink baseband data in the case where functions corresponding to Intra L2 and MAC-PHY are performed in an RU of an LTE communication system, according to an embodiment of the present disclosure.

Referring to FIG. 19, when the RU 320 processes a function corresponding to some layers (Intra L2 and MAC-PHY) according to function split setting, the payload of a QoS-important packet, which includes some main information of uplink baseband data, may include an RU identifier (ID) 1010, at which the packet has been transmitted, and control information 1920, 1930, 1940, and 1950. In the case of the RU ID 1910 at which the packet has been transmitted, since multiple RUs are connected to a single DU 310, it is possible to explicitly indicate from which RU the transmission has been made. The control information may be changed in terms of the type of detailed information thereof and whether the detailed information is transmitted according to function split setting. That is, the payload structure may adaptively change according to the function split setting.

For example, when the RU 320 processes a function corresponding to some layers (Intra L2 and MAC-PHY) by the function split setting, the payload may further include, as the control information, uplink decoding results (UL decoding results) 1920, uplink control information (UCI) 1930, measurement results from SRS 1940, and measurement results from physical random access channel (PRACH) 1950, in addition to the RU ID 1910.

At the time of de-packetization, the DU 310 obtains the RU ID 1910 having a fixed size and then obtains the UL decoding results 1920. In the case of the UL decoding results 1920, since the DU is able to know the number of information items of the decoding results of the corresponding RU, the DU 310 is able to determine the start position of the UCI 1930. Since the DU 310 is also able to know the number of uplink control information items of the corresponding RU, the DU 310 is able to know the start position of the measurements from SRS 1940 after obtaining the UCI 1930. Since the DU also knows the measurements from SRS 1940 and the number of signals for the PRACH measurement, the DU 310 is able to obtain each of measurements from PRACH 1950.

FIG. 20 is a diagram of a payload structure of a QoS-important packet including some main information of uplink baseband data in the case where functions corresponding to Intra L2, MAC-PHY, and PHY3 are performed in an RU of an LTE communication system, according to an embodiment of the present disclosure.

Referring to FIG. 20, when the RU 320 processes a function corresponding to some layers (Intra L2, MAC-PHY, and PHY3) according to function split setting, the payload of a QoS-important packet, which includes some main information of uplink baseband data, may include an RU ID 2010, at which the packet has been transmitted, and control information 2020, 2030, 2040, and 2050. In the case of the RU ID 2010 at which the packet has been transmitted, since multiple RUs are connected to a single DU 310, it is possible to explicitly indicate from which RU the transmission has been made. The control information may be changed in terms of the type of detailed information thereof and whether the detailed information is transmitted according to function split setting. That is, the payload structure may adaptively change according to the function split setting.

For example, when the RU 320 processes a function corresponding to some layers (Intra L2, MAC-PHY, and PHY3) by the function split setting, the payload may further include, as the control information, soft-demodulation results, measurements from SRS 2040, and measurement results from PRACH 2050, in addition to the RU ID 2010. The soft-demodulation results may include soft-demodulation results for UCI on PUSCH 2020 and soft-demodulation results on PUCCH 2030.

At the time of de-packetization, the DU 310 obtains the RU ID 2010 having a fixed size and then obtains the soft-demodulation results for UCI on PUSCH 2020. Since the DU 310 knows the number of allocated resources of the information, the DU 310 is able to obtain the corresponding results and to determine the start position of the soft-demodulation results on PUCCH 2030. Since the DU 310 also knows the number of allocated resources of the PUCCH, the DU is also able to obtain the corresponding information and to determine the start position of the measurements from SRS 2040. As in the case of the Intra L2 and MAC-PHY, the DU 310 is able to obtain the measurements from SRS 2040 and measurements from PRACH 2050.

FIG. 21 is a diagram of a payload structure of a QoS-important packet including some main information of uplink baseband data in the case where functions corresponding to Intra L2, MAC-PHY, PHY3, and PHY2 are performed in an RU of an LTE communication system, according to an embodiment of the present disclosure.

Referring to FIG. 21, when the RU 320 processes a function corresponding to some layers (Intra L2, MAC-PHY, PHY3, and PHY2) according to function split setting, the payload of a QoS-important packet, which includes some main information of uplink baseband data, may include an RU ID 2110, at which the packet has been transmitted, and control information 2120, 2130, 2140, and 2150. In the case of the RU ID 2110 at which the packet has been transmitted, since multiple RUs are connected to a single DU 310, it is possible to explicitly indicate from which RU the transmission has been made. The control information may be changed in terms of the type of detailed information thereof and whether the detailed information is transmitted according to function split setting. That is, the payload structure may adaptively change according to the function split setting.

For example, when the RU 320 processes a function corresponding to some layers (Intra L2, MAC-PHY, PHY3, and PHY2) by function split setting, the payload may further include, as control information, IQ symbols for UCI on PUSCH 2120, IQ symbols for PUCCH 2130, IQ symbols for SRS 2140, IQ symbols for PRACH 2150, in addition to the RU ID 2110.

At the time of de-packetization, the DU 300 obtains the RU ID 2010 having a fixed size and then obtains the IQ symbols for UCI on PUSCH 2120. Since the DU 310 knows the number of allocated resources of the information, the DU 310 is able to obtain the corresponding results and to determine the start position of the IQ symbols for PUCCH 2130. Since the DU 310 also knows the number of allocated resources of the PUCCH, the DU 310 is also able to obtain the corresponding information and to determine the start position of the IQ symbols for SRS 2140. As in the case of Intra L2, MAC-PHY, and PHY3, the DU 310 is able to obtain the IQ symbols for SRS 2140 and IQ symbols for the PRACH 2150.

Figure 22:
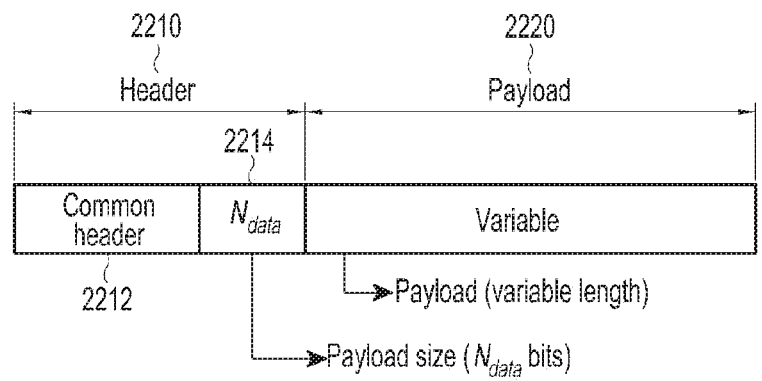
FIG. 22 is a diagram of a frame structure of a terminal-related packet, according to an embodiment of the present disclosure.

FIG. 22 is a diagram of a frame structure of a terminal-related packet, according to an embodiment of the present disclosure.

Referring to FIG. 22, a terminal-related packet may include a header 2210 and a payload 2220. The header 2210 may include a common header 2212 and a packet type-dependent header 2214. In the common header 2212, common information, which is irrelevant to the packet type, may be recorded, and the packet type-dependent header information 2214 may include information ($N_{dta}$ bits) on the length of the payload 2220.

The payload 2220 may include remaining information on downlink and uplink baseband data (user-dependent downlink and uplink data and downlink scheduling-related control information). The payload 2220 may have a variable length.

Figure 23:
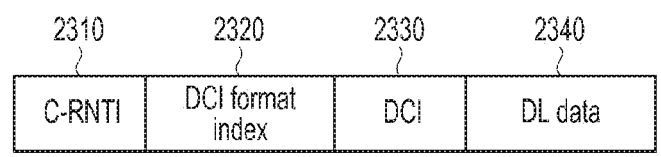
FIG. 23 is a diagram of a payload structure of a terminal-related packet for transmitting remaining information of downlink baseband data (downlink data and downlink scheduling-related control information for each user) in an LTE communication system, according to an embodiment of the present disclosure.

FIG. 23 is a diagram of a payload structure of a terminal-related packet for transmitting remaining information of downlink baseband data (downlink data and downlink scheduling-related control information for each user) in an LTE communication system, according to an embodiment of the present disclosure.

Referring to FIG. 23, the payload of a terminal-related packet including the remaining information on the downlink baseband data may include a terminal identifier (C-RNTI) 2310, a downlink control information indicator (DCI format index) 2320, a DCI 2330, and DL data 2340.

At the time of de-packetization, the RU 320 may obtain the C-RNTI 230 as a terminal identifier, and may obtain the DCI format index 2320. The RU 320 is able to confirm the size of the DCI 2330 using the DCI format index 2320. The RU 320 is able to obtain the DCI 2330 based on the size of the DCI 2330, and then to confirm the start position of the DL data 2340. The RU 320 is able to obtain the DL data 2340 using the size information of the payload included in the header information.

Figure 24:
FIG. 24 is a diagram of a payload structure of a terminal-related packet for transmitting remaining information of uplink baseband data (uplink data for each user) in an LTE communication system, according to an embodiment of the present disclosure.

FIG. 24 is a diagram of a payload structure of a terminal-related packet for transmitting remaining information of uplink baseband data (uplink data for each user) in an LTE communication system, according to an embodiment of the present disclosure.

Referring to FIG. 24, the payload of a terminal-related packet including the remaining information of uplink baseband data may include an RU ID 2410, a C-RNTI 2420, and an UL data 2430.

At the time of de-packetization, the RU 320 may obtain the RU identifier 2410 having a fixed size and the C-RNTI 2420 as a terminal identifier, and may then obtain the UL data 2430 using the size information of the payload included in the header information.

Hereinafter, descriptions will be made of a method for distinguishing information in a QoS-important packet for each terminal in performing de-packetization on the QoS-important packet.

In the case of the QoS-important packet, it is necessary to distinguish which terminal information is included in the information included in the packet in the process of receiving the corresponding packet and performing the de-packetization. For this purpose, the following two methods may be considered.

A first method includes explicit information on a corresponding user. A second method indicates which user each piece of information corresponds to, using a DU and an RU.

Since the second method uses the information commonly known by the DU and the RU, it is possible to distinguish the control information without additional information. On the other hand, the second method may be inefficient because the data included in the QoS-important packet is small, and the user information is typically too large compared to actually transmitted data.

Thus, the present disclosure provides a method of implementing the second method, which will be described with reference to an LTE communication system.

Table 4 below summarizes the information that needs to be classified according to terminals in a QoS-important packet.

TABLE 4

| | Intra L2 | MAC-PHY | PHY3 | PHY2 |
|---|---|---|---|---|
| DL baseband data | | | UL ACK/NACKs | UL ACK/NACKs |
| UL baseband data | Decoding results UCI Meas. from SRS | Decoding results UCI Meas. from SRS | UCI Meas. from SRS | UCI |

In the case of downlink baseband data, it is necessary to distinguish uplink acknowledgment information for each terminal. Since each of the DU 310 and the RU 320 is able to know a terminal using each uplink resource block, it is possible to distinguish information for each terminal using the corresponding information. It may be implemented by transmitting uplink acknowledgment information according to the following criteria:

Performing transmission in accordance with an uplink resource block index order;

In the case of an uplink multi-cluster transmission terminal, performing transmission based on the first resource block index; and In the case of terminals allocated to the same resource block with an MU-MIMO technology, performing transmission based on the demodulation-reference signal (DM-RS) phase rotation at a scheduling approval.

In addition, in the case of PHY2, the RU 320 does not know DM-RS phase rotation information. Therefore, when there are terminals allocated to the same resource block by the MU-MIMO technology, information, which can replace the DM-RS phase rotation information, needs to be sent from the DU 310 to the RU 320 in order to allow the RU 320 to distinguish the corresponding terminals.

In the case of uplink baseband data, it is necessary to distinguish uplink decoding results, uplink control information, and SRS measurement values for each terminal.

Uplink decoding results may be distinguished for each terminal using a resource block index and DM-RS phase rotation information in the same manner as uplink acknowledgment information. Uplink decoding results may be transmitted from the Intra L2 and the MAC-PHY. Since the RU 320 knows all the DM-RS phase rotation information, no additional information is required.

In the case of uplink control information, it is necessary to consider both uplink control information transmitted from the PUCCH and uplink control information multiplexed on the PUSCH. In the case of the uplink control information transmitted from the PUCCH, both the DU 310 and the RU 320 know a terminal using resources corresponding to each PUCCH index. This may be implemented by transmitting information in the PUCCH index order. In the case of the uplink control information multiplexed on the PUSCH, both the DU 310 and the RU 320 can know a terminal using each PUSCH resource. In this case, the uplink control information can be distinguished for each terminal using a resource block index and DM-RS phase rotation information in the same manner as the uplink acknowledgment information.

However, since the RU 320 cannot know the DM-RS phase rotation information in the PHY2, information that can replace the corresponding information needs to be sent from the DU 310 to the RU 320 in advance.

In the case of the sounding reference signal (SRS) measurements, information of a position from which the SRS is transmitted may be used. The information on the position where the SRS is transmitted includes a period and a sub-frame offset in a time domain for transmission, a bandwidth occupied by one SRS transmission, a frequency region in which the SRS transmission is frequency-hopped, a position on a frequency region where an SRS transmission is initiated, a transmit comb position, phase rotation, etc. Since the DU 310 and the RU 320 know all the information on the SRS to be transmitted, it is possible to distinguish measured values for each terminal using the corresponding information.

Packetization Option (Example 2)

In addition to Packetization Option Example 1 discussed above, generating an emergency message as a QoS-important packet may be set as Packetization Option Example 2. In this case, packet types in Packetization Option Example 2 are as follows:

a QoS-important packet including RU setting information;

a QoS-important packet including some main information of downlink or uplink baseband data;

a terminal-related packet including some main information of downlink or uplink baseband data; and a QoS-important packet including an emergency message of downlink or uplink baseband data.

Figure 25:
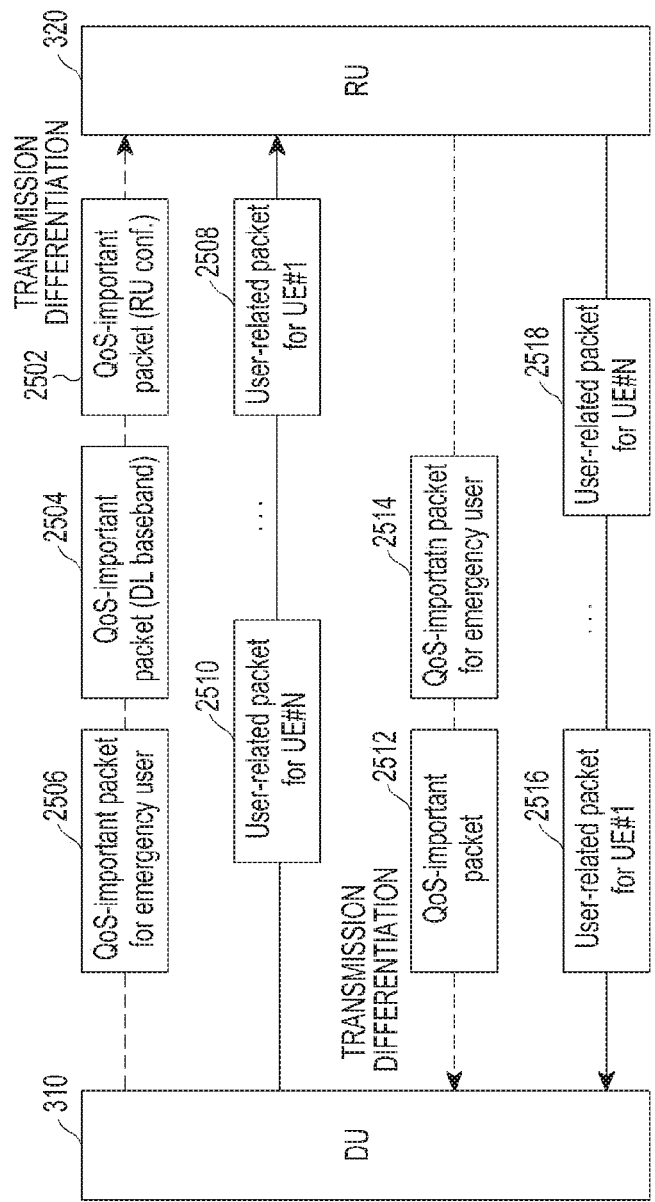
FIG. 25 is a flowchart of a method for a packet transmission procedure based on a packetization option, according to an embodiment of the present disclosure.

FIG. 25 is a flowchart of a method for a packet transmission procedure based on a packetization option, according to an embodiment of the present disclosure.

Referring to FIG. 25, downlink transmission may include transmission of a QoS-important packet for which transmission differentiation is considered and transmission of a terminal-related packet for which transmission differentiation is not considered. With this purpose in mind, the packetization option is defined to apply the QoS-wise packetization method to the transmission of a QoS-important packet for which transmission differentiation is considered, and to apply a user-wise packetization method to the transmission of a terminal-related packet for which transmission differentiation is not considered.

The DU 310 may packetize RU setting information based on the QoS-wise packetization method and may transmit the QoS-important packet generated by the packetization to the RU 320 at step 2502. The DU 310 may packetize some main information on the downlink baseband data (control information and system information on the downlink) based on the QoS-wise packetization scheme, and may transmit a QoS-important packet generated by the packetization to the RU 320 at step 2504. The DU 310 may packetize an emergency message based on the QoS-wise packetization method, and may transmit the QoS-important packet generated by the packetization to the RU 320 at step 2506. The DU 310 may apply transmission differentiation for the transmission of a QoS-important packet.

The DU 310 may packetize the remaining information on the downlink baseband data for a first user (UE #1) based on the user-wise packetization method (downlink data of UE #1 and downlink scheduling-related control information), and may transmit a terminal-related packet generated by the packetization to the RU 320 at step 2508. The DU 310 may packetize the remaining information on the downlink baseband data for an $N^{th}$ user (UE # N) (downlink data of UE # N and downlink scheduling-related control information) based on the user-wise packetization method, and may transmit a terminal-related packet generated by the packetization to the RU 320 at step 2510.

The DU 310 may perform a downlink transmission procedure of generating a downlink packet (a QoS-important packet or a terminal-related packet), and transmitting the generated downlink packet to the RU 320 via the front-haul interface.

The RU 320 may packetize some main information on the uplink baseband data (control information and system information on the uplink) based on the QoS-wise packetization method, and may transmit the generated QoS-important to the DU 310 at step 2512. The RU 320 may packetize an emergency message based on the QoS-wise packetization method, and may transmit the QoS-important packet generated by the packetization to the DU 310 at step 2514. The RU 320 may apply transmission differentiation for the transmission of a QoS-important packet.

The RU 320 may packetize the remaining information of the uplink baseband data for the first user (UE #1) (uplink data of UE #1) based on the user-wise packetization method, and may transmit the terminal-related packet generated by the packetization to the DU 310 at step 2516. The RU 320 may packetize the remaining information on the uplink baseband data for the $N^{th}$ user (UE # N) (uplink data of the UE # N) based on the user-wise packetization method, and may transmit a terminal-related packet generated by the packetization to the DU 310 at step 2518.

The RU 320 may perform an uplink transmission procedure of generating an uplink packet (a QoS-important packet or a terminal-related packet) and transmitting the generated uplink packet to the DU 310 via the front-haul interface.

Table 5 below defines a packet type indicator (value) based on Packetization Option Example 2.

TABLE 5

| Value | Packet type |
| --- | --- |
| 000 | QoS-important packet including RU setting information |
| 001 | QoS-important packet including some main information of downlink and uplink baseband data |
| 010 | Terminal-related packet including some main information of downlink and uplink baseband data |
| 011 | QoS-important packet including an emergency message of downlink and uplink baseband data |
| 100~111 | Reserved (usable for multi-level QoS-important packet) |

The packet type indicator defined in Table 5 may be information that indicates a data type included in the payload of a QoS-important packet or a terminal-related packet. The packet type indicator may be included in header information on a QoS-important packet or a terminal-related packet.

Table 6 below defines detailed transmission information of a front-haul that is included in each packet according to a packetization option.

TABLE 6

| | Intra L2 | MAC-PHY | PHY3 | PHY2 |
| --- | --- | --- | --- | --- |
| RU setting information QoS-important packet | Equal to those of Packetization Option Example 1 | | | |
| DL baseband data QoS-important packet | | | | |
| DL baseband data Terminal-rated packet | | | | |
| UL baseband data QoS-important packet | | | | |
| UL baseband data Terminal-related packet | | | | |
| DL emergency message QoS-important packet | MAC PDU DCI | MAC PDU DCI | Codewords Coded DCI | IQ symbols on PDSCH IQ symbols on PDCCH |
| UL emergency message QoS-important packet | MAC PDU | MAC PDU | Soft-demod. results on PUSCH | IQ symbols on PUSCH |

A packet frame structure for performing packetization of each packet based on Packetization Option Example 2 may be the same as the packet frame structure for performing packetization of each packet based on packetization option example 1 described above. That is, the packet frame structure of the QoS-important packet including the emergency message of the downlink or uplink baseband data, the packet type-dependent header information, and the payload structure in packetization option example 2 are all the same as those of the terminal-related packet of downlink and uplink baseband data in Packetization Option Example 1. Since the packet frame structures, packet type-dependent header information, and payload structures of all other packet types are the same, further descriptions thereof will be omitted.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A signal processing device of a base station, the signal processing device being connected to one or more wireless devices of the base station, the signal processing device comprising:
   a memory; and
   a processor configured to:
      transmit wireless device setting information to the one or more wireless devices via a front-haul interface during a transmission unit time;
      transmit a downlink packet, which is obtained by packetizing downlink baseband data, to the one or more wireless devices via the front-haul interface;
      receive an uplink packet through the front-haul interface;
      obtain uplink baseband data and inherent control information by performing uplink packetization on the received uplink packet; and
      process the uplink baseband data based on analysis of the obtained inherent control information,
   wherein each of the downlink packet and the uplink packet comprises a header in which common header information and independent header information are recorded, and a payload in which one of the downlink baseband data and the uplink baseband data is recorded,
   wherein the common header information includes a front-haul frame number and a packet type indicator,
   wherein the independent header information includes additional information dependent on a packet type and function split setting,
   wherein the payload includes base band data according to the packet type, and
   wherein the packet type indicator indicates a priority for determining service quality of the packet.

2. The signal processing device of claim 1, wherein the wireless device setting information includes downlink and uplink scheduling information, transmission mode information, and decoding information, which are used for performing a function split setting in the one or more wireless devices.

3. The signal processing device of claim 1, wherein the processor is further configured to:
   perform de-packetization on the received uplink packet to obtain decoding result information with the inherent control information;
   analyze error indicator information from the obtained decoding result information; and
   process the uplink baseband data based on the analyzed error indicator information,
   wherein the decoding result information comprises information on a decoding result extracted to correspond to a terminal in which an uplink transmission is performed.

4. The signal processing device of claim 1, wherein the processor is further configured to:
   classify the downlink baseband data for one of each service quality which is imparted on the downlink baseband data and for each terminal which receives the downlink baseband data in consideration of a packetization option; and
   perform packetization for each of the classified downlink baseband data, wherein the packetization option is defined by one of a priority corresponding baseband data, a target terminal, and whether a message is an emergency message.

5. A wireless device of a base station, the wireless device being connected to one or more signal processing devices of the base station, the wireless device comprising:
   a memory; and
   a processor configured to:
      receive wireless device setting information via a front-haul interface during a transmission unit time;
      receive a downlink packet through the front-haul interface, and transmit downlink baseband data, which is obtained by performing de-packetization on the received downlink packet, via a wireless channel;
      obtain uplink baseband data by processing a wireless signal received via the wireless channel based on the wireless device setting information;
      extract inherent control information from the obtained uplink baseband data; and
      transmit an uplink signal, which is obtained by packetizing the extracted inherent control information and the uplink baseband data, to the one or more signal processing devices via the front-haul interface,
   wherein each of the downlink packet and the uplink packet comprises a header in which common header information and independent header information are recorded, and a payload in which the downlink baseband data or the uplink baseband data is recorded,
   wherein the common header information includes a front-haul frame number and a packet type indicator,
   wherein the independent header information includes additional information dependent on a packet type and function split setting,
   wherein the payload includes base band data according to the packet type, and
   wherein the packet type indicator indicates a priority for determining service quality of the packet.

6. The wireless device of claim 5, wherein the wireless device setting information includes downlink and uplink scheduling information, transmission mode information, and decoding information, which are used for performing a function split setting in the one or more wireless devices.

7. The wireless device of claim 5, wherein the extracted inherent control information is decoding result information extracted to correspond to a terminal in which an uplink transmission is performed.

8. The wireless device of claim 5, wherein the processor is further configured to:
   classify the uplink baseband data for each service quality, which is imparted on the uplink baseband data or for each terminal, which receives the uplink baseband data in consideration of a packetization option; and
   perform packetization for each of the classified uplink baseband data,
   wherein the packetization option is defined by one of a priority of corresponding baseband data, a target terminal, and whether a message is an emergency message.

9. A method of processing data in a signal processing device of a base station, the signal processing device being connected with one or more wireless devices in the base station, the method comprising:
   transmitting wireless device setting information to the one or more wireless devices via a front-haul interface during a transmission unit time;
   packetizing the downlink baseband data received through a back-haul interface and transmitting a downlink packet generated by the packetization to the one or more wireless devices via the front-haul interface;

receiving an uplink packet through the front-haul interface and performing de-packetization on the received uplink packet to obtain uplink baseband data and inherent control information; and processing the uplink baseband data based on analysis of the obtained inherent control information, and outputting the processed uplink baseband data through the back-haul interface, wherein each of the downlink packet and the uplink packet comprises a header in which common header information and independent header information are recorded, and a payload in which the downlink baseband data or the uplink baseband data is recorded, wherein the common header information includes a front-haul frame number and a packet type indicator, wherein the independent header information includes additional information dependent on a packet type and function split setting, wherein the payload includes base band data according to the packet type, and wherein the packet type indicator indicates a priority for determining service quality of the packet.

10. The method of claim 9, wherein the wireless device setting information includes downlink and uplink scheduling information, transmission mode information, and decoding information, which are used for a function split setting in the one or more wireless devices.

11. The method of claim 9, wherein outputting the processed uplink baseband data comprises:

analyzing error indicator information from the decoding result information obtained with the inherent control information;

processing the uplink baseband data based on the analyzed error indicator information; and outputting the processed uplink baseband data via the back-haul interface, wherein the decoding result information is information on a decoding result extracted to correspond to a terminal in which an uplink transmission is performed.

12. The method of claim 9, wherein transmitting the generated downlink packet comprises:

classifying the downlink baseband data for each service quality, which is imparted on the downlink baseband data, or for each terminal, which receives the downlink baseband data, in consideration of a packetization option, and performing packetization for each of the classified downlink baseband data, and wherein the packetization option is defined by one of a priority of corresponding baseband data, a target terminal, and whether a message is an emergency message.

13. A method of processing data in a wireless device of a base station, the wireless device being connected with one or more signal processing devices in the base station, the method comprising:

receiving wireless device setting information via a front-haul interface during a transmission unit time;

receiving a downlink packet through via the front-haul interface, performing de-packetization on the received downlink packet, and transmitting downlink baseband data obtained by the de-packetization via a wireless channel;

obtaining uplink baseband data by processing a wireless signal received through the wireless channel based on the wireless device setting information;

extracting inherent control information from the obtained uplink baseband data; and performing packetization on the extracted inherent control information and the uplink baseband data and transmitting an uplink packet obtained by the packetization to the one or more signal processing devices via the front-haul interface, wherein each of the downlink packet and the uplink racket comprises a header in which common header information and independent header information are recorded, and a payload in which the downlink baseband data or the uplink baseband data is recorded, wherein the common header information includes a front-haul frame number and a packet type indicator, wherein the independent header information includes additional information dependent on a packet type and function split setting, wherein the payload includes base band data according to the packet type, and wherein the packet type indicator indicates a priority for determining service quality of the packet.

14. The method of claim 13, wherein the wireless device setting information includes downlink and uplink scheduling information, transmission mode information, and decoding information, which are used for a function split setting in the one or more wireless devices.

15. The method of claim 13, wherein the extracted inherent control information is decoding result information extracted to correspond to a terminal in which an uplink transmission is performed.

16. The method of claim 13, wherein transmitting the uplink packet includes:

classifying the uplink baseband data for each service quality, which is imparted on the uplink baseband data, or for each terminal, which transmits the uplink baseband data, in consideration of a packetization option, and performing packetization for each of the classified uplink baseband data, and wherein the packetization option is defined by one of a priority of corresponding baseband data, a target terminal, and whether a message is an emergency message.

* * * * *